United States Patent [19]

Majima

[11] Patent Number: 5,801,861
[45] Date of Patent: Sep. 1, 1998

[54] COMMUNICATION SYSTEM FOR PERFORMING WAVELENGTH DIVISION MULTIPLEXING COMMUNICATIONS, AND WAVELENGTH CONTROL METHOD USED IN THE SYSTEM

[75] Inventor: Masao Majima, Isehara, Japan

[73] Assignee: Canon Kabushiki Kaisha, Tokyo, Japan

[21] Appl. No.: 707,485

[22] Filed: Sep. 19, 1996

[30] Foreign Application Priority Data

| Sep. 19, 1995 | [JP] | Japan | 7-239703 |
| Sep. 19, 1995 | [JP] | Japan | 7-239706 |
| Sep. 20, 1995 | [JP] | Japan | 7-241730 |
| Sep. 10, 1996 | [JP] | Japan | 8-238999 |

[51] Int. Cl.$^6$ ............................................. H04J 14/02
[52] U.S. Cl. ............................................. 359/124; 359/121
[58] Field of Search ............................. 359/118, 120–121, 359/124–125, 128, 133

[56] References Cited

U.S. PATENT DOCUMENTS

| 4,809,362 | 2/1989 | Claus et al. ............ | 359/120 |
| 5,144,466 | 9/1992 | Nakamura et al. ...... | 359/123 |
| 5,341,232 | 8/1994 | Popp ...................... | 359/120 |
| 5,343,314 | 8/1994 | Nakamura et al. ...... | 359/123 |
| 5,396,360 | 3/1995 | Majima ................... | 359/133 |
| 5,559,625 | 9/1996 | Smith et al. ............ | 359/125 |

FOREIGN PATENT DOCUMENTS

| 0 715 429 A2 | 6/1996 | European Pat. Off. . |
| 8-163092 | 6/1996 | Japan . |

OTHER PUBLICATIONS

Toba, Hiromu et al., "A Demand–Assign Optical Frequency–Division–Multiple–Access Star Network", Journal of Lightwave Technology, vol. 11, No. 5/6, May/Jun. 1993, pp. 1088–1094.

Glance, B. et al., "Frequency Stabilisation Of FDM Optical Signals From Different Locations", Electronics Letters, vol. 23, No. 23, Nov. 5, 1987, pp. 1243–1245.

"Fast wavelength detection technique for multi–wavelength photonic packet networks", Electronics Letters, Sep. 16, 1993, vol. 29, No. 19, pp. 1705–1706.

"Optical Add–Drop Multiplexing Network incorporated Centralized Wavelength Control", Technical Report of the Institute of Electronics, Information and Communication Engineers, OCS94–36 (1994–07), pp. 25–32.

Dragone, C. et al., "Efficient Multichannel Integrated Optics Star Coupler on Silicon", Photonics Technology Letters, vol. 1, No. 8, pp. 241–243, ISSN 1041–1135.

Primary Examiner—Kinfe-Michael Negash
Attorney, Agent, or Firm—Fitzpatrick, Cella, Harper & Scinto

[57] ABSTRACT

A communication system has a first communication system for performing wavelength division multiplexing communications, and a second communication system independent of the first communication system. In the communication system, a wavelength control unit detects the wavelength arrangement in the first communication system, generates a wavelength control signal on the basis of the detected wavelength arrangement, and transmits the wavelength control signal to the respective communication nodes via the second communication system. Each communication node controls its transmission wavelength on the basis of the wavelength control signal. As the wavelength control unit, there are disclosed an arrangement for arranging a wavelength control node independently of the communication nodes, an arrangement using a communication node in a non-receiving state, and an arrangement for assigning the function of the wavelength control unit to a center node.

51 Claims, 21 Drawing Sheets

FIG. 2
(a) UPON START OF LIGHT EMISSION
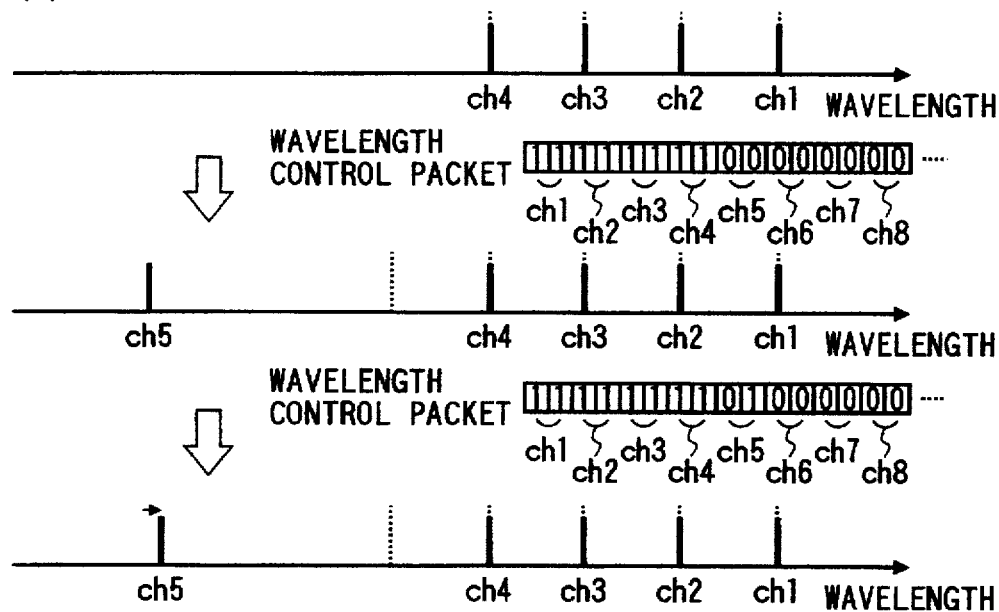
(b) CORRECTION OF STAGGER
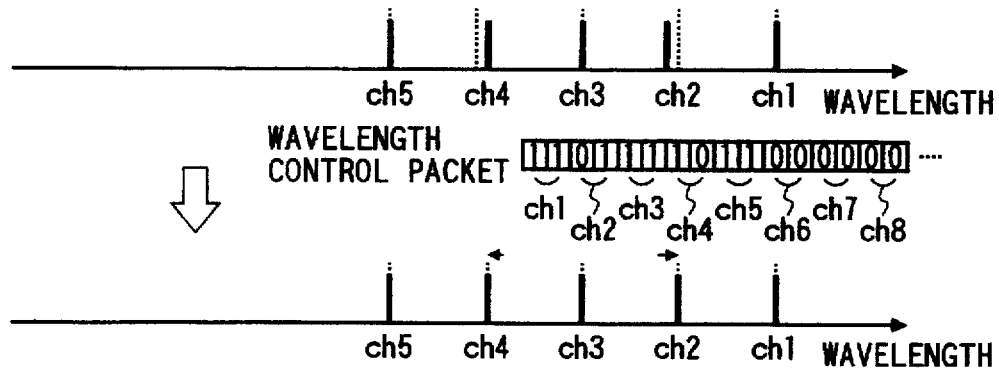
(c) ELIMINATION OF UNOCCUPIED SPACE
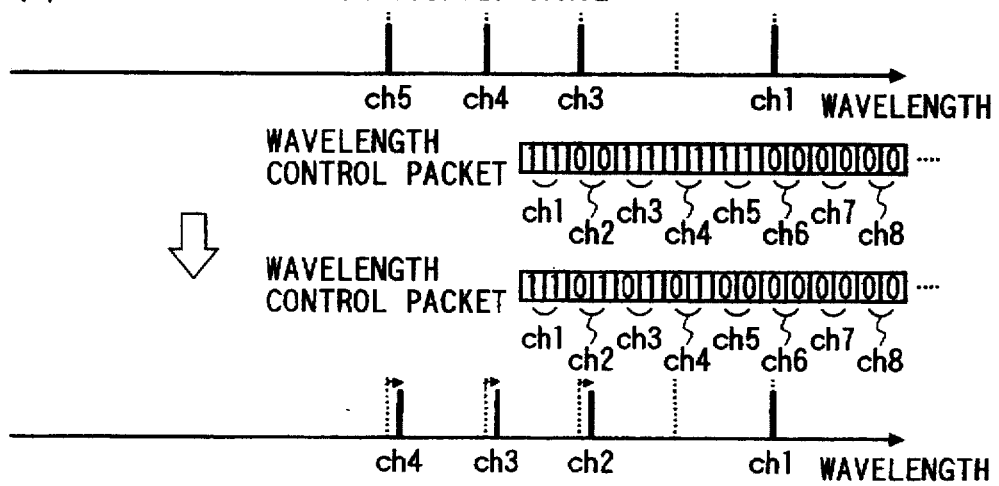

FIG. 18

(1) WAVELENGTH ARRANGEMENT BEFORE LIGHT-EMISSION OF WAVELENGTH VARIABLE OPTICAL TRANSMITTER IN OPTICAL NODE D
WAVELENGTH RANGE OF WAVELENGTH DIVISION MULTIPLEXING COMMUNICATION SYSTEM

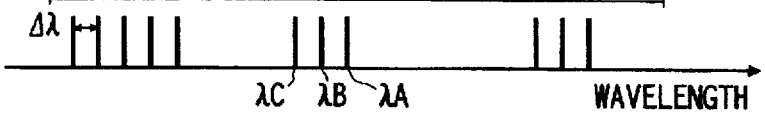

(2) WAVELENGTH ARRANGEMENT UPON LIGHT-EMISSION AT SHORTEST WAVELENGTH OF WAVELENGTH VARIABLE OPTICAL TRANSMITTER IN OPTICAL NODE D
WAVELENGTH VARIABLE RANGE OF WAVELENGTH VARIABLE OPTICAL TRANSMITTER IN OPTICAL NODE OF TERMINAL EQUIPMENT A

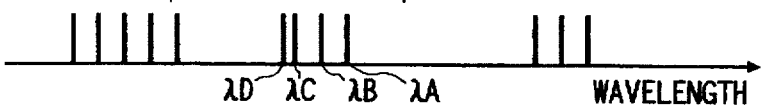

(3) WAVELENGTH ARRANGEMENT UPON SETTING WAVELENGTH IN WAVELENGTH VARIABLE OPTICAL TRANSMITTER OF OPTICAL NODE D

(4) WAVELENGTH ARRANGEMENT WHEN OPTICAL NODE D SETS WAVELENGTH IN WAVELENGTH VARIABLE OPTICAL TRANSMITTER AND THEREAFTER IN STEADY STATE

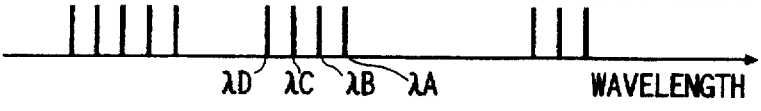

(5) WAVELENGTH ARRANGEMENT WHEN OPTICAL NODE B STOPS LIGHT-EMISSION OF WAVELENGTH VARIABLE OPTICAL TRANSMITTER

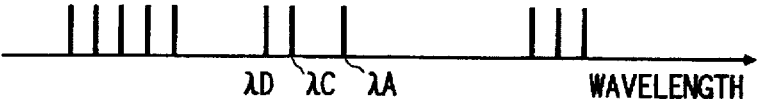

(6) WAVELENGTH ARRANGEMENT WHEN OPTICAL NODES C, D SHIFT WAVELENGTH IN WAVELENGTH VARIABLE OPTICAL TRANSMITTERS

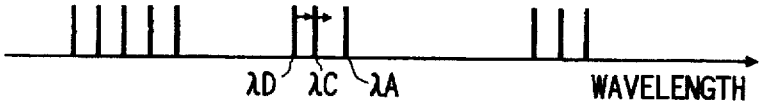

(7) WAVELENGTH ARRANGEMENT IN STEADY STATE AFTER OPTICAL NODE B HAS STOPPED LIGHT-EMISSION OF WAVELENGTH VARIABLE OPTICAL TRANSMITTER

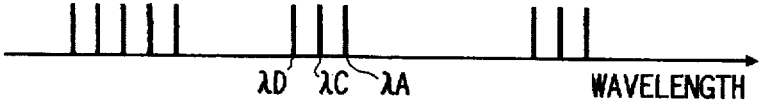

FIG. 21
(a) CERTAIN COMMUNICATION NODE STARTS TO LIGHT-EMIT WITH ch5
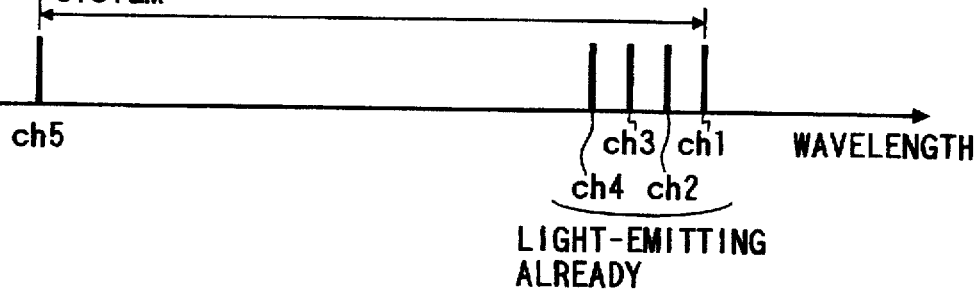
(b) STEADY STATE OF (a)
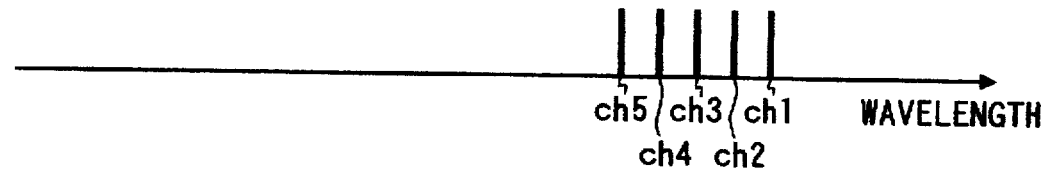
(c) COMMUNICATION NODE WHICH USED ch3 STOPS LIGHT-EMITTING
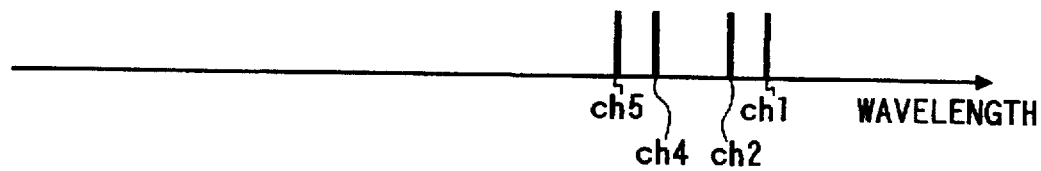
(d) STEADY STATE OF (c)

5,801,861

COMMUNICATION SYSTEM FOR PERFORMING WAVELENGTH DIVISION MULTIPLEXING COMMUNICATIONS, AND WAVELENGTH CONTROL METHOD USED IN THE SYSTEM

BACKGROUND OF THE INVENTION

1. Field of the Invention

The present invention relates to a communication system for performing wavelength division multiplexing communications and, more particularly, to a communication system for performing high-density wavelength division multiplexing communications and a wavelength control method used in the system.

2. Related Background Art

In recent years, a society in which anyone can transmit a large volume of information to anyone whenever he or she wants to has been strongly demanded. Hence, an optical communication system that is expected to be capable of transmitting a large volume of information at high speed has been hoped for. In particular, by multiplexing a large number of wavelengths using optical fibers, giga bit rates come true, and tera bit rates may come true in near future. The present invention has a more effective arrangement to meet such demand of the time.

Wavelength division multiplexing communications (WDM: Wavelength Division Multiplexing) that uses an optical signal as a transmission medium are also called optical frequency division multiplexing communications (optical FDM: Optical Frequency Division Multiplexing), and can have a large number of independent channels (transmission wavelengths) in units of different wavelengths in a single transmission path. Since no multiplexing on the time axis such as frame synchronization is required unlike in time division multiplexing (TDM), the transmission rates of the respective channels need not be matched. For this reason, the WDM communications are suitable for multimedia communications which are required to have network flexibility.

As an example of a WDM communication system, a system which adopts a passive star arrangement and has signals of both a WDM communication system and a communication system independent therefrom is known. In this WDM communication system, the WDM communication system is used in line communications such as one to one communications and one to multiple communications. On the other hand, the lines of the communication system independent from the WDM communication system are used for control communications of the WDM communication system and packet communications (this system will be referred to as a packet communication system hereinafter).

FIG. 20 shows an example of the arrangement of the WDM communication system. Referring to FIG. 20, terminal equipments 612 to 61n are connected to a star coupler 33 via communication nodes 322 to 32n and optical fibers 341 to 34n and 351 to 35n to constitute a network. The optical signal output from each of the communication nodes 322 to 32n is distributed to all the communication nodes 322 to 32n (including the own node) via the star coupler 33.

FIG. 6 shows the wavelength arrangement of optical signals transmitted on the optical fibers 341 to 34n and 351 to 35n serving as transmission paths in the WDM communication system. The WDM communication system is assigned the 1.5 μm band as a low-loss region of the optical fibers, and the packet control communication system for wavelength control is assigned the 1.3 μm band. The WDM communication system has m (m≦n: the number of channels is smaller than the number of communication nodes) independent wavelength channels. Each communication node occupies a channel as needed to perform communications between communication nodes. The packet communication system is commonly used by all the communication nodes using a protocol such as FDDI (Fiber Distributed Data Interface) or the like.

When the wavelength separation (to be referred to as a ch separation hereinafter) between adjacent channels is set on the 10 GHz order (about 0.08 nm upon wavelength-conversion in the 1.55 μm band) so as to increase the number of channels in the WDM communication system, the control must be made to maintain the transmission wavelengths of the respective communication nodes. As a method for maintaining the ch separations of the transmission wavelengths from the distributed communication nodes constant, some methods have been proposed (e.g., "Frequency Stabilization of FDM Optical Signals Originating from different locations", Electronic Letters, Vol. 23 (1987), No. 23, par. 1243–1245, and the like).

Of such methods, a so-called FCS (Floating Channel Stack) method, which is proposed by the present inventor and is disclosed in Japanese Patent Application No. 6-296660, allows easy initial setting and re-setting of waveforms, and does not require any wavelength detection circuit in the transmitter of each communication node, resulting in easy control.

In this FCS method, each communication node detects the ch separation between the wavelength of the own node and that of the neighboring channel on the longer wavelength side, and controls the wavelength of the own node so that the ch separation remains constant. FIG. 21 shows an example of the operation of this method. At the beginning of light emission of the own communication node, the node selects a wavelength on the shorter wavelength side of the wavelength range of the WDM communication system, e.g., a wavelength indicated by, e.g., ch5 in FIG. 21, separated away from channels ch1 to ch4 of other communication nodes that have already emitted light ((a) of FIG. 21), gradually shifts the wavelength toward the longer wavelength side, outputs the transmission wavelength of the own node onto the optical transmission path when the ch separation from the neighboring wavelength (ch4) on the longer wavelength side has reached a predetermined value, outputs a communication signal to a desired partner station, and maintains a steady state ((b) of FIG. 21). When another communication node has completed transmission and stops light emission (ch3 in (c) of FIG. 21), communication nodes (ch4, ch5) that emit light on the shorter wavelength side of ch3 gradually shift their light-emission wavelengths toward the longer wavelength side, stop wavelength shift when the ch separation from the corresponding neighboring transmission wavelength on the longer wavelength side has reached a predetermined value, and maintain transmission at the light-emission wavelengths ((d) of FIG. 21). As a result, in the steady state, the transmission wavelengths of the respective communication nodes are allocated at equal ch separations from the longer wavelength end of the wavelength range of the WDM communication system ((b) and (d) of FIG. 21). The above-mentioned operations are performed since each communication node comprises a mechanism for detecting the light-emission wavelength of the own node and the neighboring wavelength on the longer wavelength side, and controlling the ch separation between the detected wavelengths to fall within a predetermined range.

SUMMARY OF THE INVENTION

It is an object of the present invention to provide a novel arrangement for controlling the wavelength channel separation and, more particularly, to constitute a network system with low cost.

In order to achieve the above object, a communication system comprises a first communication system for performing wavelength division multiplexing communications, a second communication system for performing communications independently of the first communication system, and a plurality of communication nodes for performing communications via at least the first communication system, and is characterized in that a wavelength control unit in the communication system detects the wavelength arrangement in the first communication system, and transmits a wavelength control signal based on the detected wavelength arrangement to the plurality of communication nodes via the second communication system, and the plurality of communication nodes control transmission wavelengths on the basis of the wavelength control signal.

With this arrangement, since the wavelength of light to be output from each communication node onto the first communication system is controlled, crosstalk can be prevented. Each communication node need not control the wavelength of output light from the own node by detecting the wavelength arrangement, and need not comprise a system for detecting the wavelength arrangement independently of the system for receiving a wavelength division multiplexed signal.

The wavelength control unit may be arranged at any position in the communication system. For example, the wavelength control unit may be arranged in the form of a wavelength control node which is arranged independently of the plurality of communication nodes.

A plurality of such wavelength control nodes may be arranged. At this time, if one wavelength control node fails, another wavelength control node can perform wavelength control instead, thus improving the reliability of the communication system. In an arrangement for switching the wavelength control node that outputs a wavelength control signal, the first wavelength control node may output the wavelength control signal, and when the first wavelength control node ceases to output the wavelength control signal for some reason, the second wavelength control node may output the wavelength control signal. The second wavelength control node may monitor the wavelength control signal sent via the second communication system, and output the wavelength control signal when it cannot receive the wavelength control signal for a predetermined period of time or longer.

On the other hand, the first and second wavelength control nodes may alternately output the wavelength control signal. This arrangement is preferable since the load on the wavelength control nodes can be distributed. At this time, when one wavelength control node ceases to output the wavelength control signal, the output interval of the wavelength control signal may be prolonged. In such case, the remaining wavelength control node need only shorten the output interval of the wavelength control signal. Hence, even when one wavelength control fails, accurate wavelength control can be realized.

In the arrangement using the plurality of wavelength control nodes, whether or not the other wavelength control node is functioning normally can be detected by detecting the wavelength arrangement of the first communication system. More specifically, when the own wavelength control node does not output any wavelength control signal, if it detects a control error of the wavelength arrangement in the first communication system, it is probable that the other wavelength control node is not functioning properly, and at that time, the own wavelength control node can output the wavelength control signal. With this arrangement, since the wavelength control node need not monitor the wavelength control signal output from another wavelength control node, the reception function of the second communication system can be omitted.

In place of arranging any wavelength control nodes, a communication node, which is not receiving any signal via the first communication system at the moment, of the plurality of communication node may serve as the wavelength control unit. In this arrangement, the wavelength control node need not be arranged, and the arrangement can be simplified. Especially, of communication nodes which are not receiving any signals via the first communication system, if a communication node in a state just before it receives a signal via the first communication system or just after it has received a signal via the first communication system serves as the wavelength control unit, when the wavelengths of channels to be used in the first communication system are controlled to be arranged at predetermined wavelength separations, the above-mentioned state means an irregular wavelength separation state, and the communication node that caused this state takes over the function of the wavelength control unit. At this time, when the output interval of the wavelength control signal from the communication node in the state just before it receives a signal via the first communication system or just after it has received a signal via the first communication system is set to be shorter than that from a communication node in the state just before it receives a signal via the first communication system or just after it has received a signal via the first communication system, and in a state wherein it is not receiving any signal via the first communication system, the above-mentioned irregular wavelength separation state can be recovered quickly.

The communication node that serves as the wavelength control unit may be altered in such a manner that a communication node which is not receiving any signal via the first communication system becomes the wavelength control unit when it has not received the next wavelength control signal for a predetermined period of time after it received the last wavelength control signal. At this time, when the duration of the predetermined period of time is changed depending on the states of the communication nodes, communication nodes that serve as the wavelength control unit can be assigned different levels of priority. More specifically, the predetermined period of time may be shortened for a communication node which is desirable as the wavelength control unit.

The communication node that serves as the wavelength control unit may also be altered in such a manner that the communication node which is currently serving as the wavelength control unit designates a communication node which is to serve as the next wavelength control unit.

On the other hand, the communication system may have an arrangement in which the respective communication nodes are connected to a center node, and the wavelength control unit may be arranged in the center node. At this time, if the center node controls not to distribute signals sent from each of the plurality of communication nodes via the first communication system to other communication nodes until they are assigned predetermined wavelengths, the first communication system can be prevented from being influenced adversely when an uncontrollable wavelength runs away, when transmission is to be started, and when the wavelength is to be shifted beyond those which are being used by other communication nodes.

The wavelength control signal preferably includes wavelength control information of all the channels used in the first communication system since all the communication nodes can identify the wavelength arrangement state at substantially the same time.

The wavelength control signal may include, as information for controlling the wavelengths of the respective channels, information for "maintaining", "shifting toward the longer wavelength side", and "shifting toward the shorter wavelength side" the wavelength of each channel.

The wavelength control signal may include information indicating channels which are not used in the first communication system. At this time, the communication node can determine a channel to be used on the basis of information indicating channels which are not being used currently.

Channels to be used in the first communication system may be assigned by demand assign control using the second communication system.

As described above, the wavelengths used in the first communication system are preferably arranged at predetermined wavelength separations since the wavelength band can then be used at high density.

The first and second communication systems may have various arrangements such as a wavelength division multiplexing arrangement, an arrangement using different transmission paths, and the like. When the first and second communication systems are multiplexed, the wiring layout can be simplified. In this case, each communication node need only comprise means for demultiplexing signals of the first and second communication systems.

BRIEF DESCRIPTION OF THE DRAWINGS

FIG. 2 is a chart showing an example of the operation of the wavelength control method according to the first embodiment of the present invention;

FIG. 18 is an explanatory view of the operation of the wavelength control method of the optical center node according to the eleventh embodiment of the present invention;

FIG. 21 is a chart showing an example of the operation of the wavelength control method of a reference example.

DETAILED DESCRIPTION OF THE PREFERRED EMBODIMENTS

The preferred embodiments of the present invention will be described in detail hereinafter with reference to the accompanying drawings.

[First Embodiment]

In the first embodiment, a wavelength control node arranged in a network detects the entire wavelength arrangement of a WDM communication system (first communication system), and informs communication nodes in the network of control information for maintaining predetermined wavelength separations of adjacent channels of the WDM communication system via a packet communication system (second communication system) independently of the WDM communication system. Each communication node controls, based on this control information, the wavelength of the light source of the transmitter of the WDM communication system in the own node to be separated by a predetermined wavelength separation from that of a neighboring channel.

In this embodiment, an independent communication system is used as the packet communication system, and the control information is broadcasted as a packet from the wavelength control node to all the communication nodes in the network. The wavelength control node has only a transmission function of the packet communication system, and transmits wavelength control packets at predetermined time intervals.

Figure 1:
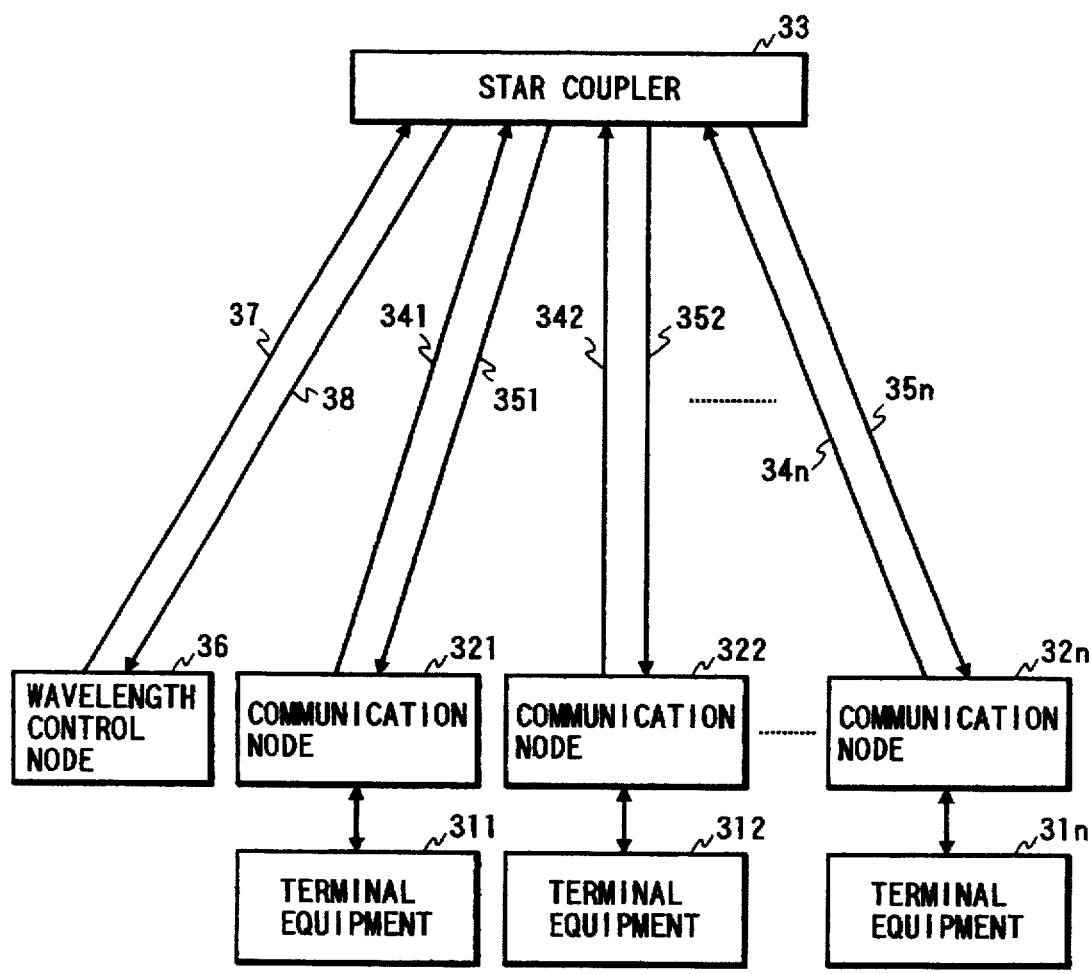
FIG. 1 is a block diagram showing the arrangement of a WDM communication system to be applied to the first embodiment of the present invention.

The first embodiment will be described in detail below with reference to the accompanying drawings. FIG. 1 is a block diagram showing the arrangement of a WDM communication system to which the wavelength control method of the first embodiment is applied, and shows a passive star type WDM communication system having n terminal equipments. This embodiment is characterized by comprising a wavelength control node 36 and optical fibers 37 and 38 for connecting the node 36 and a star coupler 33. Terminal equipments 311 to 31n perform communications using transmission and reception signals via communication nodes 321 to 32n. The communication nodes 321 to 32n convert electrical signals supplied from the terminal equipments 311 to 31n into optical signals, and output these optical signals onto optical fibers 341 to 34n. Also, the communication nodes 321 to 32n convert optical signals input from optical fibers 351 to 35n into electrical signals. The star coupler 33 distributes optical signals input from the optical fibers 341 to 34n and the optical fiber 37 to the optical fibers 351 to 35n and the optical fiber 38.

FIG. 2 shows an example of the operation of the wavelength control method of this embodiment. FIG. 2 shows the wavelength arrangement before the control operation, the wavelength control packet to be transmitted in a corresponding state, and the wavelength arrangement after the control operation in correspondence with three cases, i.e., (a) upon start of light emission, (b) correction of stagger, and (c) elimination of unoccupied space. In the wavelength arrangement chart shown in FIG. 2, the solid line indicates the wavelength of a communication node that has already emitted light, and the dotted line indicates the target wavelength of the wavelength control. A detailed operation will be described later.

Figure 3:
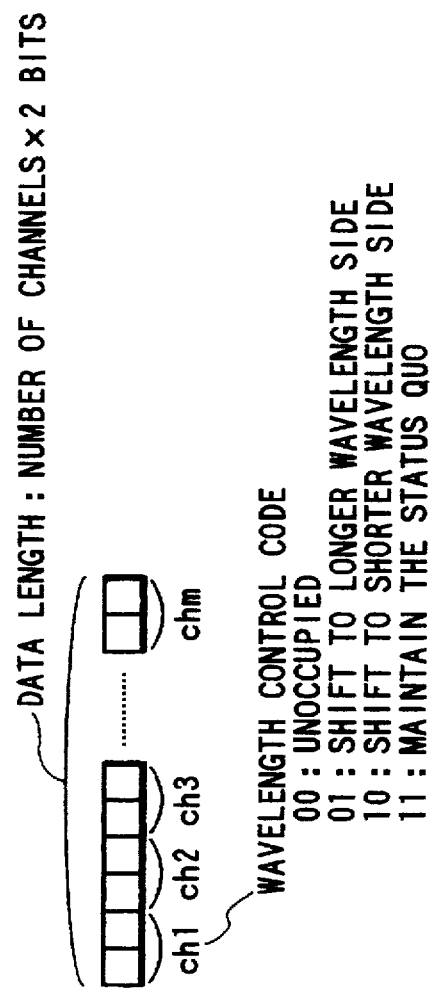
FIG. 3 is a view showing the data format of a wavelength control packet used in the first embodiment of the present invention.

FIG. 3 shows the data format of the wavelength control packet to be transmitted via the packet communication system so that the wavelength control node of this embodiment controls the wavelengths of the communication nodes in the system. A 2-bit wavelength control code is assigned per channel. The packet includes the 2-bit wavelength control codes in correspondence with a maximum number of channels (m channels), and its data length is m×2 bits. For each channel, "00" indicates an unoccupied channel, "01" indicates shifting the wavelength to the longer wavelength side, "10" indicates shifting the wavelength to the shorter wavelength side, and "11" indicates maintaining the status quo.

Figure 4:
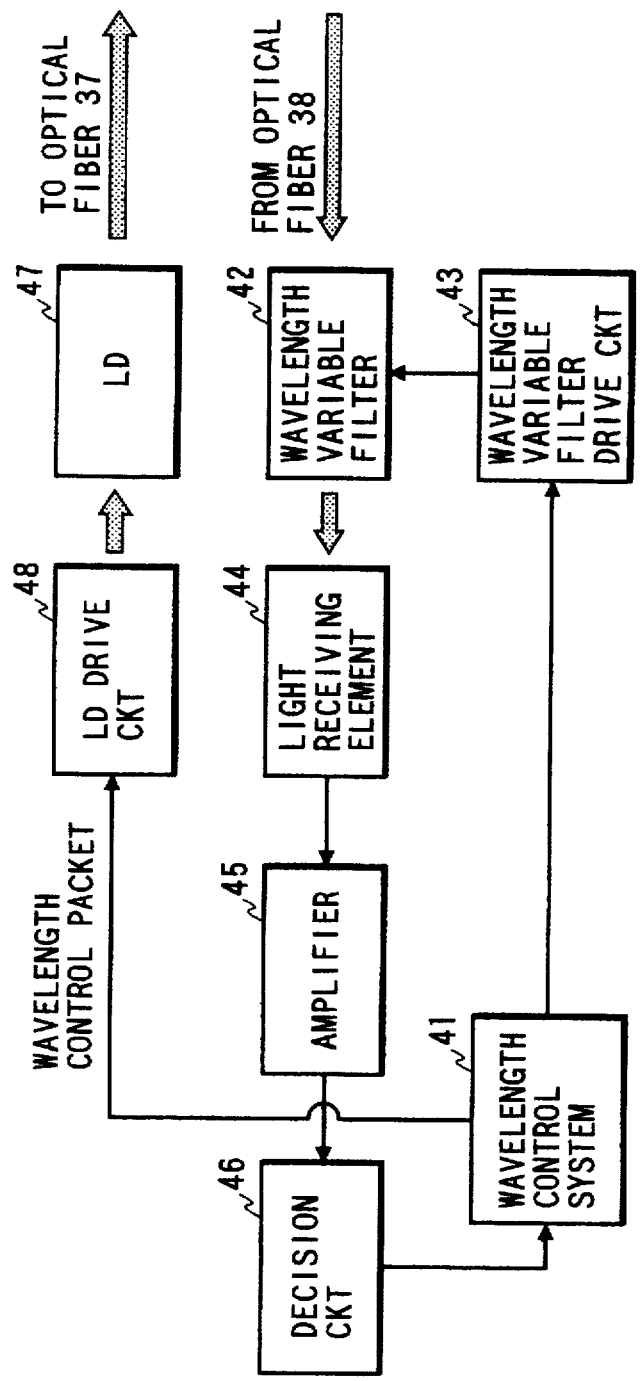
FIG. 4 is a block diagram showing the arrangement of a wavelength control node in the first embodiment of the present invention.

FIG. 4 is a block diagram showing the arrangement of the wavelength control node 36. The wavelength control node 36 comprises a wavelength control system 41, a wavelength variable filter 42, a wavelength variable filter drive circuit 43, a light-receiving element 44, an amplifier 45, a decision circuit 46, an LD 47, and an LD drive circuit 48.

The wavelength control system 41 comprises an arithmetic processing circuit, a memory element, a D/A converter, and the like. Based on a control signal supplied from the wavelength control system 41, the peak wavelength (to be simply referred to as a wavelength hereinafter) of the bandpass spectrum of the wavelength variable filter 42 is swept via the wavelength variable filter drive circuit 43, and the output from the filter 42 is converted into an electrical signal by the light-receiving element 44. The electrical signal is supplied to the decision circuit 46 via the amplifier 45, the wavelength arrangement of the WDM communication system is detected on the basis of the output signal from the decision circuit 46, and a wavelength control packet is output via the packet communication system. The LD 47 is driven via the LD drive circuit 48, and the wavelengths of the communication nodes are controlled via the optical fiber 37.

The wavelength variable filter 42 detects the wavelength arrangement of the WDM communication system. In this embodiment, the wavelength band of the WDM communication system is set to be the 1.5 μm band. The half width of the bandpass spectrum of the wavelength variable filter 42 is preferably about ⅕ to ⅙ of the ch separation (e.g., 1 GHz for ch separation: 5 GHz (corresponding to 0.04 nm in the 1.5 μm band). As a currently practical wavelength variable filter, for example, a fiber Fabry-Perot filter described in the draft of ECOC (European Conference on Optical Communication) '90-605, "A field-worthy, high-performance, tunable fiber Fabry-Perot filter", is known. This element has passing spectral peaks in units of FSRs (Free Spectral Ranges), and when the FSR is set to be equal to or larger than the wavelength variable range of the WDM communication system, the element can serve as an optical band-pass filter. The passband wavelength of the filter 42 can be varied by the drive voltage supplied from the wavelength variable filter drive circuit 43.

The wavelength variable filter drive circuit 43 is a voltage-controlled type voltage source, and voltage-amplifies a control signal supplied from the wavelength control system 41. The light-receiving element 44 converts light transmitted through the wavelength variable filter 42 into an electrical signal, and the amplifier 45 amplifies the converted electrical signal. The decision circuit 46 compares the amplified electrical signal with a threshold value. When the electrical signal is equal to or higher than the threshold value, the decision circuit 46 outputs a digital signal "1" to the wavelength control system 41; when the electrical signal is lower than the threshold value, the circuit 46 outputs a digital signal "0" to the wavelength control system 41. By comparing the digital output from the decision circuit 46 with a control voltage to be supplied to the wavelength variable filter drive circuit 43, the wavelength control system 41 determines if the channel in question is separated from the channel of the wavelength present on the light-receiving optical fiber by the predetermined ch separation. If the predetermined ch separation is detected, the wavelengths are maintained in units of channels; otherwise, control signals indicating "shift to the longer wavelength side", "shift to the shorter wavelength side", "unoccupied channel", and the like are output.

The LD 47 is a light source of the packet communication system, and has the 1.3 μm band in this embodiment but may have other wavelengths. The LD drive circuit 48 is a current source for modulating the LD 47 by a communication control signal supplied from the wavelength control system 41. In this embodiment, since no high-density wavelength division multiplexing is performed in the packet communication system, the LD 47 is directly intensity-modulated. However, other modulation methods may be used.

Figure 5:
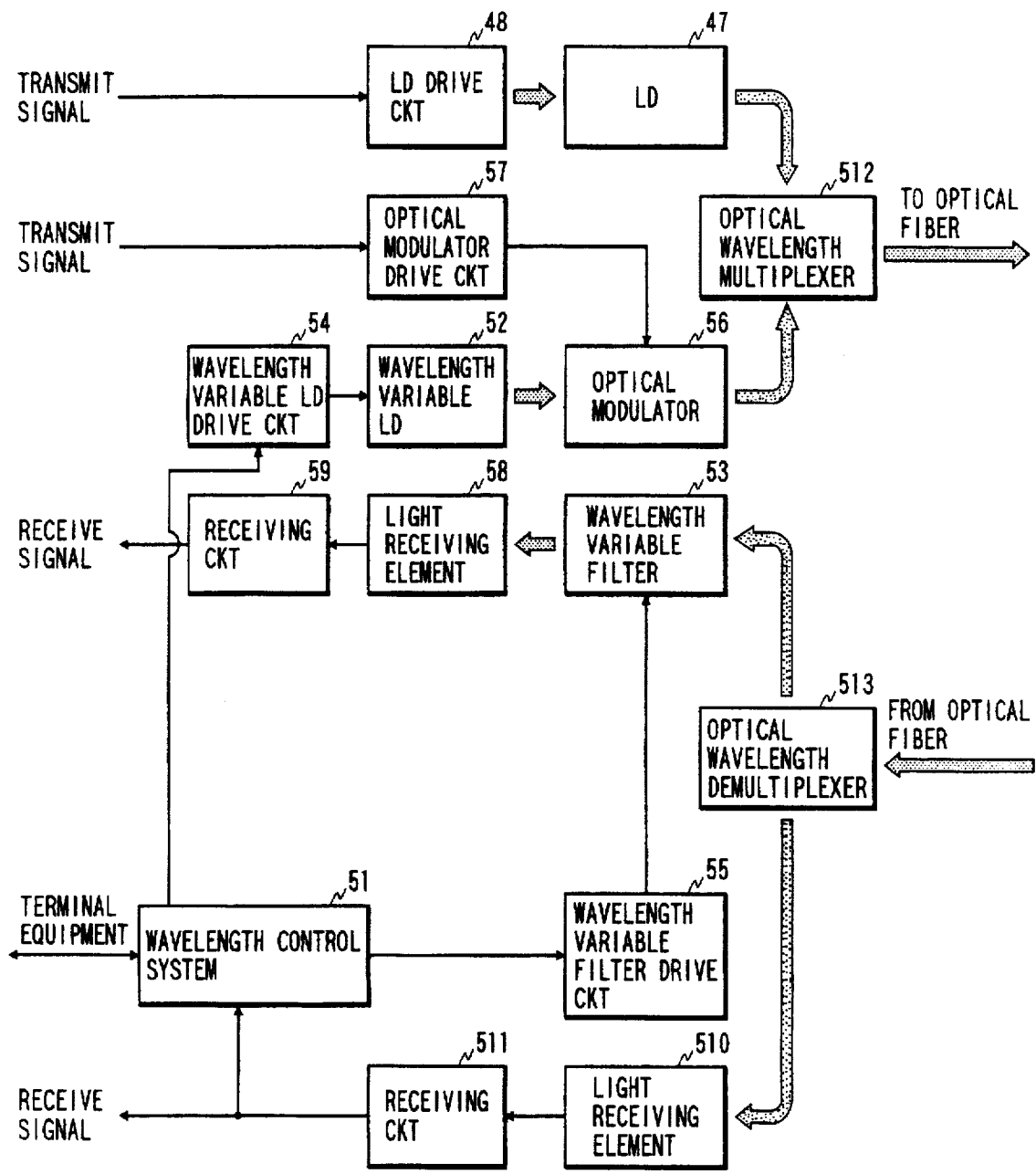
FIG. 5 is a block diagram showing the arrangement of a communication node to be applied to the first embodiment of the present invention.

FIG. 5 is a block diagram of each of the communication nodes 321 to 32n. Each communication node has two functions of the WDM communication system and the packet communication system. The WDM communication system is constituted by a wavelength control system 51, a wavelength variable LD 52, a wavelength variable LD drive circuit 54, an optical modulator 56, an optical modulator drive circuit 57, a wavelength variable filter 53, a wavelength variable filter drive circuit 55, a light-receiving element 58, and a receiving circuit 59. The packet communication system is constituted by an LD 47, an LD drive circuit 48, a light-receiving element 510, and a receiving circuit 511. The transmitters and receivers of the two communication systems are respectively connected via an optical wavelength multiplexer 512 and an optical wavelength demultiplexer 513.

The wavelength control system 51 controls the wavelength variable LD 52 via the wavelength variable LD drive circuit 54 on the basis of the contents of the wavelength control packet from the receiving circuit 511. On the other hand, the wavelength control system 51 controls the passband wavelength of the wavelength variable filter 53 via the wavelength variable filter drive circuit 55, so as to match the wavelength of the wavelength variable filter 53 with that of a channel addressed to the own node of those of the WDM communication system, and maintain the matched wavelength.

The wavelength variable LD 52 is a transmission light source of the WDM communication system, and its wavelength band is, e.g., the 1.5 μm band. Nowadays, extensive studies are being made to broaden the wavelength variable width, and as a currently practical LD, a multi-electrode DBR (Distributed Bragg Reflector) or DFB (Distributed Feedback) type LD is known, and its wavelength variable width is several nm. For example, an LD described in The Institute of Electronics, Information and Communication Engineers, OQE (Optical and Quantum Electronics), 89-116, "Three-electrode Length Resonator λ/4 shift MQWDFB Laser" is known.

Furthermore, the wavelength variable filter 53 is a wavelength variable filter for reception of the WDM communication system, and its wavelength band is, e.g., the 1.5 μm band like in the wavelength variable filter 42 shown in FIG. 4. The half width of the bandpass spectrum of this filter is preferably about ⅓ to ⅙ of the ch separation (e.g., 1.5 GHz when the ch separation =5 GHz).

The wavelength variable LD drive circuit 54 is a voltage-controlled type current source, and drives the wavelength variable LD 52 (injects a current thereto) so as to obtain a wavelength corresponding to the control signal supplied from the wavelength control system 51. When the above-mentioned three-electrode length resonator λ/4 shift MQWDFB laser is used, the wavelength variable LD drive circuit 54 generates three outputs.

The wavelength variable filter drive circuit 55 is a voltage-controlled type voltage source. The circuit 55 receives a wavelength control signal and a lock ON/OFF signal from the wavelength control system 51. In a reception channel selection (lock OFF) mode, the circuit 55 drives the wavelength variable filter 53 to obtain a wavelength corresponding to the control signal supplied from the wavelength control system 51; in a reception (lock ON) mode, the circuit 55 locks the wavelength of the wavelength variable filter 53 at that of the reception channel.

Furthermore, the optical modulator 56 and the optical modulator drive circuit 57 intensity-modulate output light from the wavelength variable LD 52 by a transmission signal of the WDM communication system input from the terminal equipment. When the output light is directly modulated by a current to be into to be injected to the wavelength variable LD 52, wavelength variations of about 0.1 nm occur. For this reason, an external intensity modulation method using the optical modulator 56 is preferably used. However, a method of directly intensity-modulating the wavelength variable LD by a transmission signal may be adopted.

On the other hand, the light-receiving element 58 and the receiving circuit 59 receive a reception signal addressed to the own node of the WDM communication system. These circuits convert an optical signal of the channel selected by the wavelength variable filter 53 into an electrical signal, thereby reconstructing an electrical signal as a digital signal. The reconstructed reception signal is output to the terminal equipment and is subjected to signal processing.

The LD 47 and the LD drive circuit 48 of the packet communication system convert a packet signal into an optical signal as in those shown in FIG. 4, and output the optical signal at a wavelength of, e.g., 1.3 μm onto the optical fiber via the optical wavelength multiplexer 512. A signal of the packet communication system is received by the light-receiving element 510 and the receiving circuit 511 as in other communication nodes, and a control signal sent in the packet format is detected. The detected control signal is output to the wavelength control system 51.

The optical wavelength multiplexer 512 wavelength-multiplexes an optical signal of the WDM communication signal in, e.g., the 1.5 μm band and an optical signal of the packet communication system in the 1.3 μm band, and outputs the multiplexed signal onto the optical fiber. On the other hand, the optical wavelength demultiplexer 513 demultiplexes an optical signal input from the optical fiber on the basis of the wavelength band, supplies an optical signal of the 1.5 μm band to the wavelength variable filter 53, and supplies an optical signal of the 1.3 μm band to the light-receiving element 510.

Figure 6:
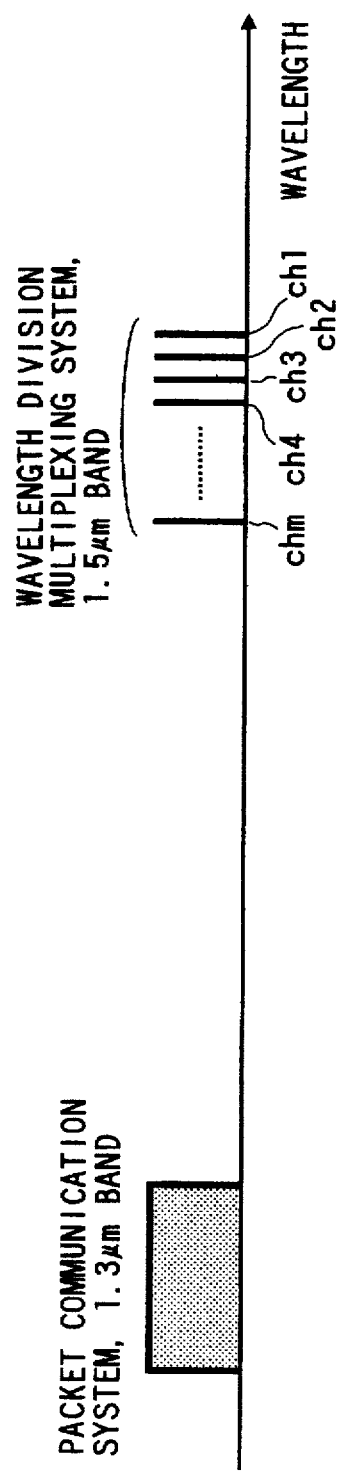
FIG. 6 is a chart showing the wavelength arrangement of a WDM communication system to be applied to the present invention and the prior art.

FIG. 6 shows the wavelength arrangement in this embodiment. The packet communication system uses the 1.3 μm band, and the WDM communication system uses the 1.5 μm band. In the packet communication system, the wavelength control of the light source is not performed, and the wavelength width of a channel is large since no high-density wavelength division multiplexing is performed. On the other hand, in the WDM communication system, the wavelengths of the light sources of the respective communication nodes are controlled to hold the ch separation, and the wavelength width of each channel is small, since high-density (ch separation: 10 GHz (0.08 nm) or less) wavelength division multiplexing is performed (a maximum of m channels).

The wavelength control node shown in FIG. 4 repetitively performs a series of operations, i.e., detection of the wavelength arrangement in the optical fiber, calculation of the shift directions of the respective channels, and transmission of a wavelength control packet, thereby controlling the transmission wavelengths of the respective communication nodes.

The wavelength control node detects the wavelength arrangement by sweeping the passband wavelength of the wavelength variable filter 42 over the entire wavelength range of the WDM communication system. The sweep step is set to be smaller than the half width of the bandpass spectrum of the wavelength variable filter 42 so as to detect the light-emission wavelength of each communication node (for example, the step is 0.25 GHz when the half width of the bandpass spectrum is 1 GHz). In this case, for the wavelength of one channel, the output from the decision circuit 46 becomes "1" in a plurality of consecutive steps. The wavelength control system 41 determines the central one of these steps as the wavelength position. Since the wavelength control system 41 controls the sweeping operation of the wavelength variable filter 42 by a voltage, the positional relationship among the wavelengths is converted from a control voltage to be supplied to the wavelength variable filter drive circuit 43. Note that the wavelength variable filter 42 has nonlinear voltage-wavelength characteristics. The wavelength control system 41 pre-stores such characteristics, and can normally detect the wavelength arrangement on the basis of the control voltage.

The shift direction of the transmission wavelength of each communication node which is emitting light is determined as follows. Assume that ch1 represents the wavelength on the longest wavelength side, and ch2 and ch3 are allocated on the shorter wavelength side of the wavelength ch1. The shift direction of ch2 is determined, so that ch2 is allocated at a position separated by the predetermined ch separation from ch1 toward the shorter wavelength side. The shift direction of ch3 is determined, so that ch3 is allocated at a position separated by two ch separations from ch1 toward the shorter wavelength side. Similarly, the shift direction of chm is determined so that chm is allocated at a position separated by (m-1) ch separations from ch1 toward the shorter wavelength side.

The shift amount per step of the wavelength variable LD 52 shown in FIG. 5 is set to be smaller than the half width of the bandpass spectrum of the reception wavelength variable filter 53 of the WDM communication system (e.g., the shift amount is 0.5 GHz with respect to the half width of 1.5 GHz of the bandpass spectrum).

The channels are assigned to the communication nodes as follows. A channel having the smallest number and data of the wavelength control code "00" in the wavelength control packet set before start of light emission of the transmission wavelength is assigned to the communication node in question. Thereafter, this communication node controls the wavelengths using the wavelength control code of this channel until the following two states are attained.

(1) State wherein a communication has been completed, and light emission is to be stopped
(2) State wherein the wavelength control code of a channel having a number smaller than that of the own channel becomes "00".

In state (2), a channel having a number smaller by one is assigned to this communication node, which controls the wavelength in accordance with the wavelength control code of this channel thereafter.

An example of the operation of the above-mentioned wavelength control method will be described below with reference to FIG. 2.

(a) Upon Start of Light Emission

Assume that the wavelength arrangement of the WDM communication system before start of light emission is, as shown in the uppermost chart in (a) of FIG. 2, i.e., ch1 to ch4 are arranged, as shown in (a) of FIG. 2. Note that the wavelength arrangement of the packet communication system is not shown. Four channels have already been used, and the wavelength arrangement is held at the predetermined ch separations with reference to ch (the solid lines coincide with the dotted lines). In this wavelength arrangement, the wavelength control codes in the wavelength control packet are "11" for ch1 to ch4, and "00" for ch5 and the subsequent channels. Since a channel having a wavelength control code "00" and the smallest number is ch5, the communication node that starts light emission is assigned a channel ch5, and starts light emission from the shorter wavelength side using ch5. In the wavelength arrangement after start of light emission, only ch5 is staggered from other channels in use, as shown in the middle chart in (a) of FIG. 2. In this wavelength arrangement, the wavelength control codes are "11" for ch1 to ch4, and "01" for ch5, and "00" for ch6 and the subsequent channels. The communication node assigned ch5 shifts the wavelength toward the longer wavelength side after it receives this wavelength control packet. The wavelength control code is kept to be "01" until the solid line coincides with the dotted line in the wavelength arrangement chart, and the communication node assigned ch5 shifts the wavelength toward the longer wavelength side each time it receives the wavelength control packet. In this manner, crosstalk upon start of light emission can be prevented, and the wavelength can be quickly shifted to a position separated by the predetermined wavelength separation from a neighboring channel.

(b) Correction of Stagger

The upper chart in (b) of FIG. 2 shows a state wherein five channels are used, and ch2 and ch4 are staggered from the wavelength arrangement at the ch separations with reference to ch1. In (b) of FIG. 2, ch2 is staggered on the shorter wavelength side, and ch4 is staggered on the longer wavelength side. In this wavelength arrangement, the wavelength control codes are "11" for ch1, ch3, and ch5, "00" for ch6 and the subsequent channels, "01" for ch2, and "10" for ch4. The communication node which uses ch2 shifts the wavelength toward the longer wavelength side after it receives this wavelength control packet. The communication node which uses ch4 shifts the wavelength toward the shorter wavelength side after it receives this wavelength control packet. With this control, the stagger of the wavelength arrangement is corrected, as shown in the lower chart in (b) of FIG. 2.

(c) Elimination of Unoccupied Space

The upper chart in (c) of FIG. 2 shows a state wherein the communication node that used ch2 of the five channels in use has finished a communication and stops light emission. An unoccupied space (a space larger than two ch separations) is formed between ch1 and ch3. The wavelength control codes in the first wavelength control code after this state are "11" for ch1, ch3, ch4, and ch5, and "00" for ch2, ch6, and the subsequent channels. The communication nodes that have received this wavelength control packet and use ch3 and the subsequent channels recognize that ch2 is in the "unoccupied state", and decrement their own channel numbers by one. In the next wavelength control packet, the wavelength control codes are "11" for ch1, "01" for ch2 to ch4, and "00" for ch5 and the subsequent channels. After reception of this wavelength control packet, the communication nodes that use ch2 to ch4 shift their wavelengths toward the longer length side. The wavelength control codes for ch2 to ch4 are kept to be "01" until the solid lines of these channels coincide with the dotted lines on the wavelength arrangement chart, and the communication nodes using ch2 to ch4 shift their wavelengths toward the longer wavelength side every time they receive a wavelength control packet. When the communication nodes using ch2 to ch4 reach the desired transmission wavelengths, the same wavelength arrangement as that shown in (a) of FIG. 2 is attained.

In this embodiment, the arrangement of the wavelength control node is simple since it need not have a reception function of the packet communication system, as shown in FIG. 4. Each communication node does not require any wavelength variable filter, decision circuit, and the like, used for detecting the wavelength arrangement, and hence, its arrangement can be simplified. Therefore, a low-cost WDM communication system can be realized as a whole.

[Second Embodiment]

This embodiment is characterized in that the wavelength control node has a reception function of the packet communication system, and transmits a wavelength control packet not at predetermined timings but at arbitrary timings as needed. The arrangement of the entire system is the same as that shown in FIG. 1 above.

Figure 7:
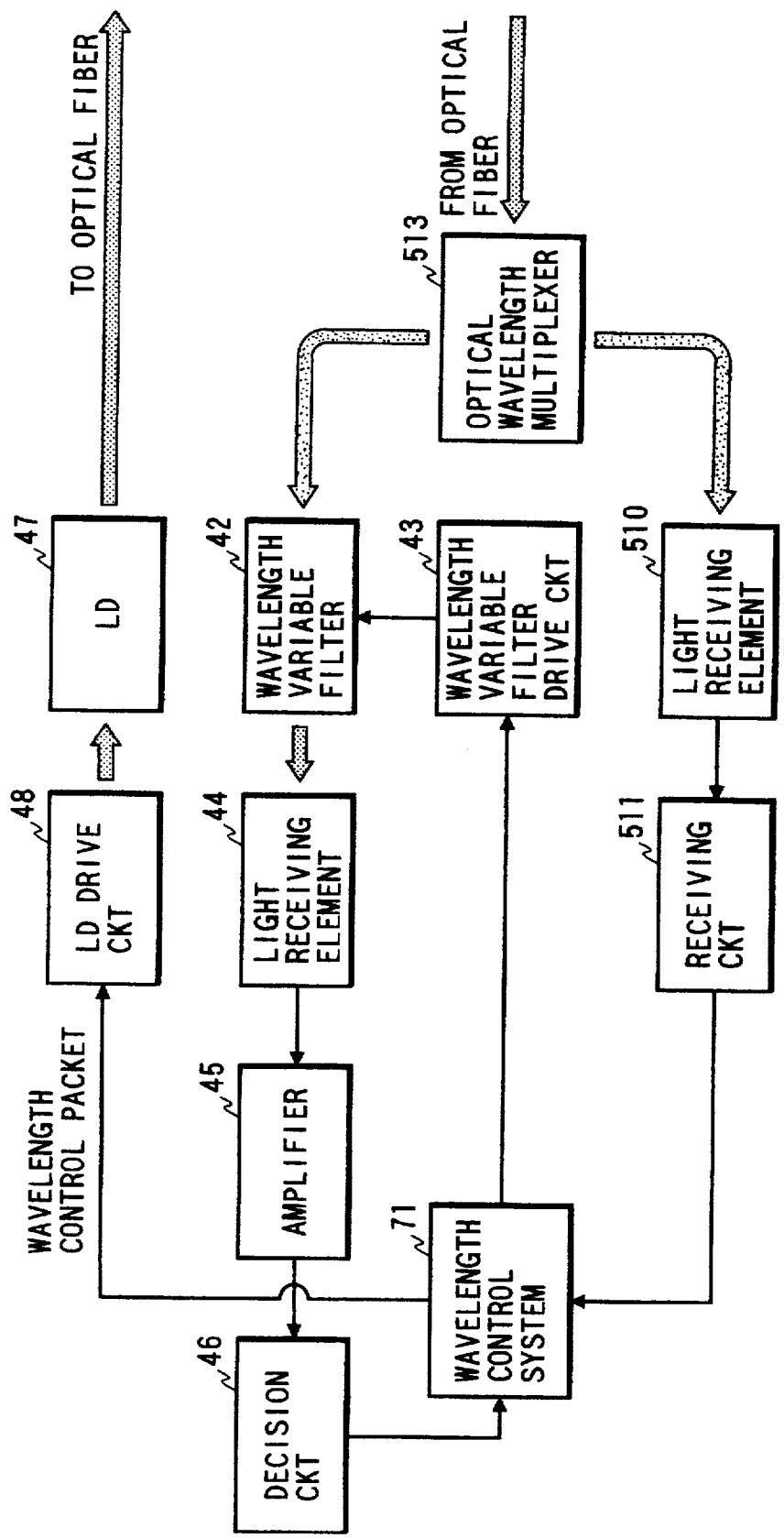
FIG. 7 is a block diagram showing the arrangement of a wavelength control node in the second embodiment of the present invention.

FIG. 7 is a block diagram showing the arrangement of the wavelength control node of this embodiment. The difference from the first embodiment (FIG. 4) is that the wavelength control node of this embodiment comprises the reception function of the packet communication system. The reception function of the packet communication system is constituted by a light-receiving element 510, a receiving circuit 511, and an optical wavelength demultiplexer 513. The functions of these constituting elements are the same as those used in each communication node shown in FIG. 5.

In this embodiment, the wavelength control node transmits a wavelength control packet not at predetermined time intervals but in only the following three cases:

(1) when there is a communication node which is about to start light emission;

(2) when the wavelength arrangement is staggered; and (3) when an unoccupied space is formed.

The wavelength arrangement is detected at predetermined time intervals shorter than the transmission time intervals of packets after a light-emission request has been received from a communication node via the packet communication system. A channel to be used is assigned by demand assign control of the packet communication system. Other arrangements and operations of this embodiment are the same as those in the first embodiment.

When each communication node is to start communication transmission from the own terminal equipment to another terminal equipment, it transmits, as an optical signal, a code indicating the presence of a light-emission start event on schedule via the transmission path of the packet communication system in a non-transmission state of the packet communication system. On the other hand, when each communication node stops a communication performed so far, it also transmits, as an optical signal, a code indicating this via the packet communication system. The wavelength control node converts an optical signal of the 1.3 μm band of the packet communication system into an electrical signal using the light-receiving element 510, receives and interprets the code transmitted from each communication node using the receiving circuit 511, and transfers the interpreted code to a wavelength control system 71. The wavelength control system 71 detects the stagger of the wavelength arrangement or stop of the use of the wavelength via the decision circuit 46, and transmits wavelength control codes onto the optical fiber via the packet communication system in correspondence with cases (1) to (3) above. Each communication node controls the wavelength arrangement of the WDM communication system in accordance with the wavelength control codes.

In this embodiment, since a wavelength control packet need not be transmitted at predetermined time intervals, the traffic of the packet communication system can be effectively utilized for other communications between communication nodes. Since the channels to be used in the WDM communication system are assigned by demand assign control using the packet communication system, crosstalk caused by the simultaneous use of channels can be avoided.

In the above embodiments, the wavelengths are arranged with reference to the channel of the longest wavelength, but may be arranged with reference to the shorter wavelength side.

The constituting elements of the wavelength control node and the communication nodes to which the above-mentioned control method is applied are not limited to those described in the above embodiments as long as they have the same functions (the same applies to a system constituted by some constituting elements). Numerical values are not limited to those described in the above embodiments as long as they fall within their operation allowable ranges.

As described above, according to the first and second embodiments, in a high-density WDM communication system which maintains the wavelength separation between adjacent channels of the WDM communication system constituted by distributed communication nodes, each communication node in the system need not comprise any wavelength variable filter independently of the filter for receiving a WDM signal, and can be realized by a simple, low-cost arrangement.

According to the first embodiment, in the above-mentioned communication system, the need for the reception function of the packet communication system in the wavelength control node can be obviated, and a low-cost wavelength control node can be realized.

According to the first and second embodiments, in the above-mentioned communication system, crosstalk at the beginning of light emission in the WDM communication system can be prevented by the control packet signal.

[Third Embodiment]

In this embodiment, a communication node in a non-receiving state serves as a wavelength control node in place of arranging a wavelength control node like in the first and second embodiments described above, and a wavelength variable filter arranged in the receiver of each communication node of the WDM communication system is used as a wavelength arrangement detection means for wavelength control.

In this embodiment, in a steady state, one of communication nodes transmits a wavelength control packet to maintain the steady state. In an unsteady state (when a certain channel starts light emission or stops light emission), a communication node that receives the channel which started light emission for transmission or a channel which stopped light emission outputs a wavelength control packet to shift the wavelength arrangement to the steady state.

Figure 8:
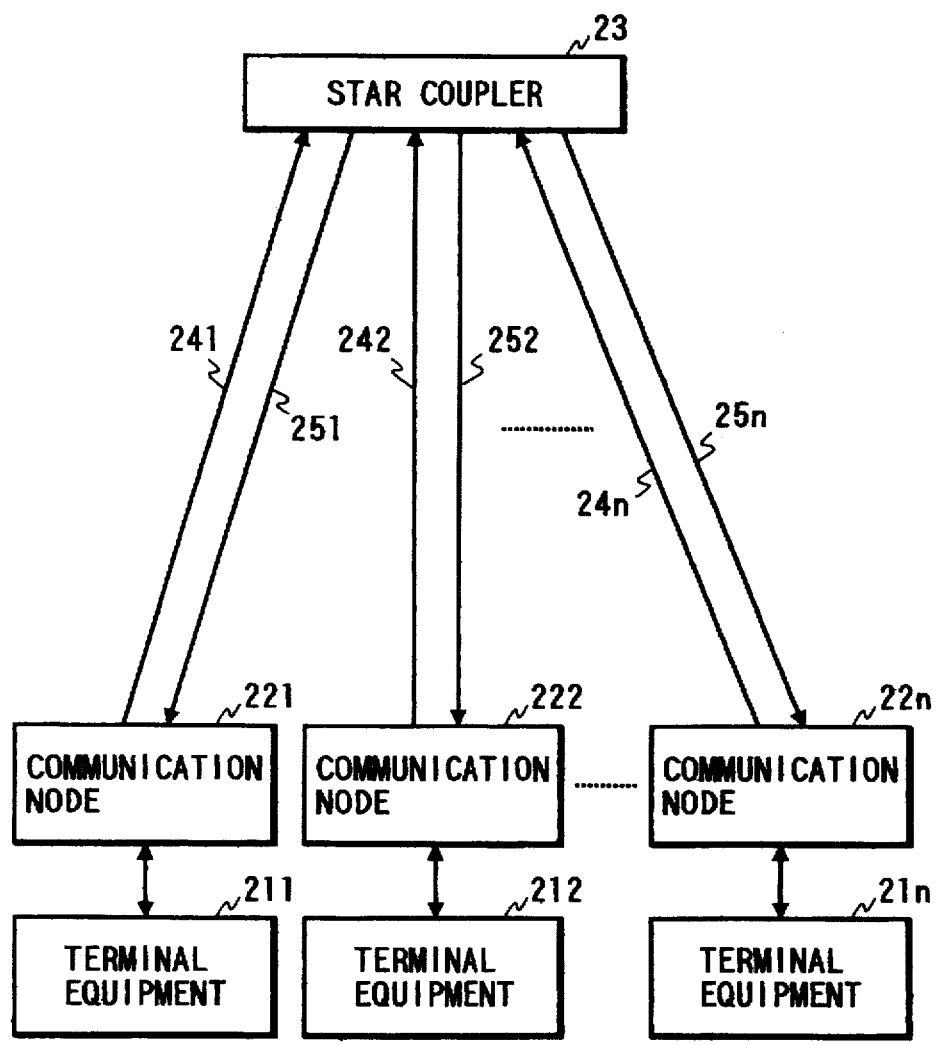
FIG. 8 is a block diagram of a WDM communication system to be applied to the present invention.

This embodiment will be described in detail below with reference to the accompanying drawings. FIG. 8 is a block diagram showing the arrangement of the system. In the arrangement shown in FIG. 8, the wavelength control node 36 and the optical fibers 37 and 38 are omitted from that shown in FIG. 1. Terminal equipments 211 to 21n transmit/receive data in the form of electrical signals. Communication nodes 221 to 22n transmit/receive data with the terminal equipments 211 to 21n in the form of electrical signals, convert received data into optical or electrical signals, and have a wavelength control function (to be described later). A star coupler 23 distributes optical signals received via optical fibers 241 to 24n to optical fibers 251 to 25n. With this arrangement, the WDM communication system is realized.

Figure 9:
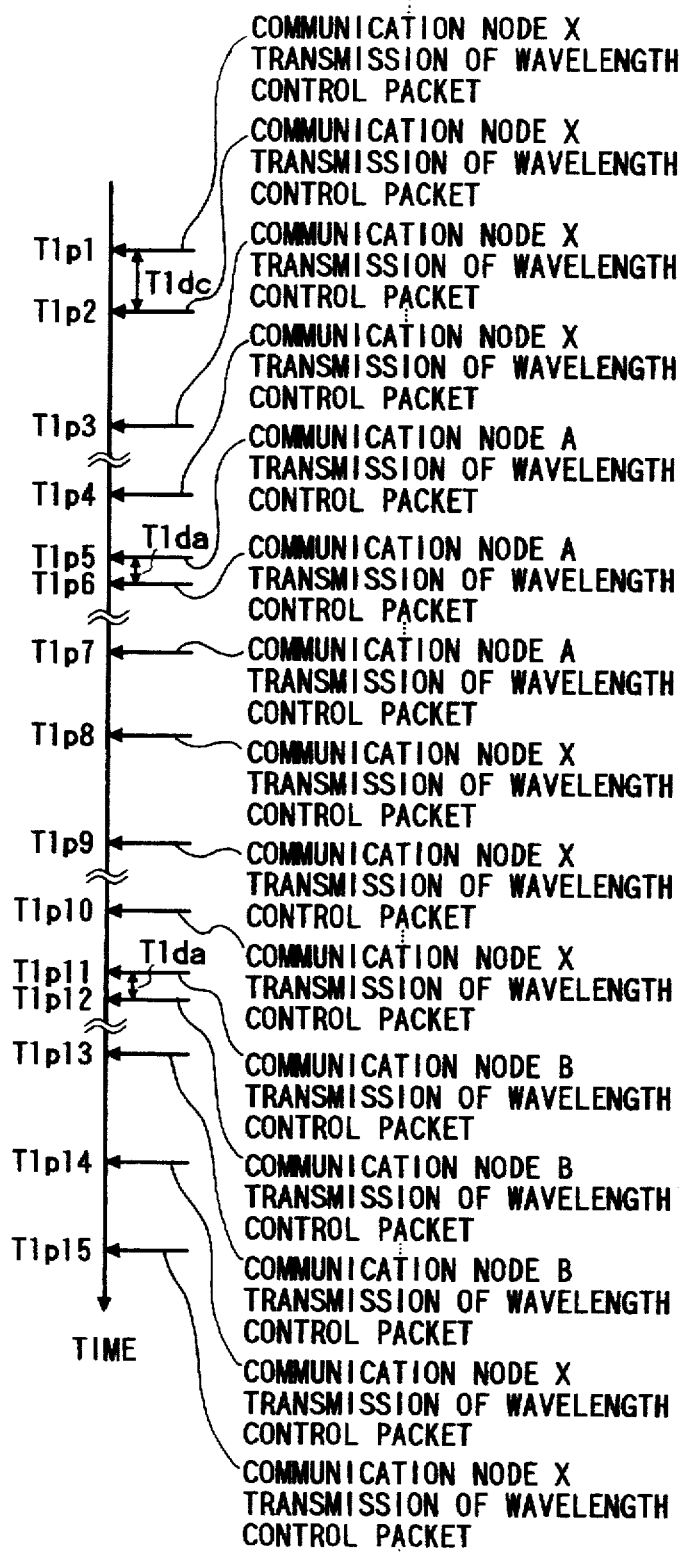
FIG. 9 is a chart showing an example of the operation of the wavelength control method according to the third embodiment of the present invention.

FIG. 9 shows the shift state of a wavelength controlling part in the wavelength control method of the present invention. The time axis extending in the up-and-down direction in FIG. 9 plots the transmission timings of wavelength control packets (T1p1 to T1p15). T1da indicates the transmission interval of wavelength control packets while one communication node serves as a wavelength controlling part in an unsteady state. FIG. 9 shows an example of I) steady state→II) unsteady state due to start of light emission in one channel→III) steady state→IV) unsteady state due to stop of light emission in one channel→V) steady state.

Figure 10:
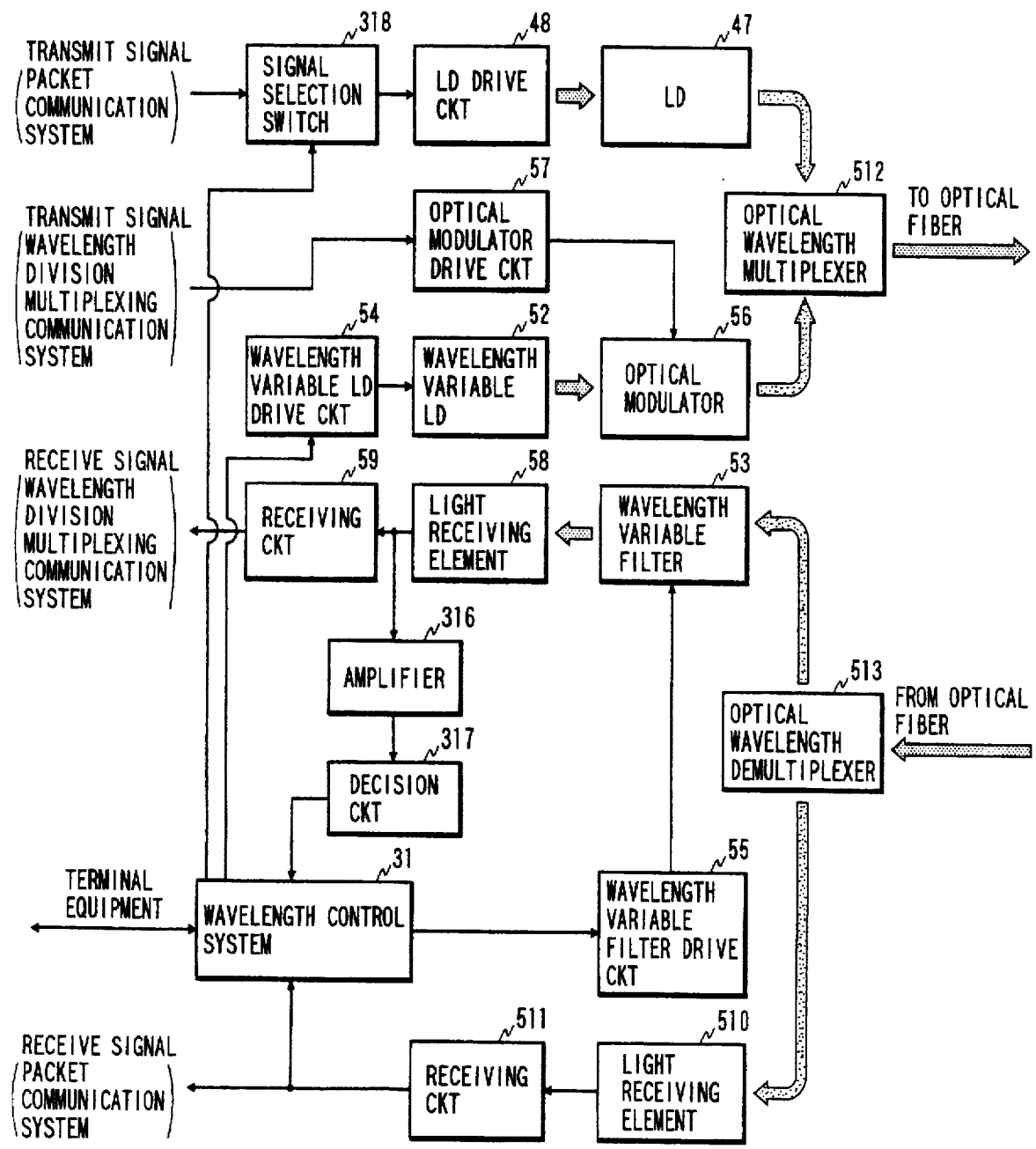
FIG. 10 is a block diagram showing the arrangement of a communication node to be applied to the third embodiment of the present invention.

FIG. 10 is a block diagram showing the arrangement of each of the communication nodes 221 to 22n shown in FIG. 8. Unlike in FIG. 5, a detection signal obtained by detecting the wavelength in the optical fiber is input from a light-receiving element 58 to a wavelength control system 31 via an amplifier 316 and a decision circuit 317 so as to control a signal selection switch 318 which selects one of a signal of the packet communication system and a signal of the wavelength control system 31.

More specifically, the wavelength control system 31 controls a wavelength variable LD 52 via a wavelength variable LD drive circuit 54 on the basis of the contents of a wavelength control packet received from a receiving circuit 511 of the packet communication system, thereby shifting or maintaining the light-emission wavelength. On the other than, the wavelength control system 31 controls the wavelength of a wavelength variable filter 53 via a wavelength variable filter drive circuit 55. In a receiving state of the WDM communication system, the wavelength control system 31 controls the wavelength of the wavelength variable filter 53 to match it with that of one addressed to the own node of the channels. In a non-receiving state, the wavelength control system 31 sweeps the wavelength of the wavelength variable filter 53 over the entire wavelength range of the WDM communication system to detect the wavelength arrangement on the basis of the output from the decision circuit 317 at that time, and generates a wavelength control packet.

The wavelength variable LD 52 is a transmission light source of the WDM communication system. The wavelength variable filter 53 is used for receiving data of the WDM communication system, and detecting the wavelength arrangement. Furthermore, the wavelength variable LD drive circuit 54 is a voltage-controlled type current source, and drives the wavelength variable LD 52 (injects a current thereto), so as to obtain a wavelength corresponding to a control signal supplied from the wavelength control system 31. The wavelength variable filter drive circuit 55 is a voltage-controlled type voltage source. The circuit 55 receives a wavelength control signal and a lock ON/OFF signal from the wavelength control system 31. In a reception channel selection state and a non-receiving state, a look OFF state is set, and the circuit 55 drives the wavelength variable filter 53 to scan the passband wavelength, so as to obtain a wavelength corresponding to a control signal supplied from the wavelength control system 31. In a receiving state, a lock ON state is set, and the circuit 55 locks the wavelength of the wavelength variable filter 53 at that of the reception channel.

An optical modulator 56 and an optical modulator drive circuit 57 intensity-modulate output light from the wavelength variable LD 52 by a transmission signal of the WDM communication system, which signal is input from one, connected to the own node, of the terminal equipments 211 to 21n. When the output light is directly modulated by a current to be injected into the wavelength variable LD 52, since wavelength variations of about 0.1 nm occur, an external intensity modulation method using the optical modulator 56 is preferably used.

The light-receiving element 58 and a receiving circuit 59 are used for receiving data of the WDM communication system. The light-receiving element 58 and the receiving circuit 59 convert an optical signal of a channel selected by the wavelength variable filter 53 into an electrical signal, and reconstruct it as, e.g., communication information of a digital signal. The reconstructed reception signal is output to the terminal equipment.

The amplifier 316 amplifies the output from the light-receiving element 58, and the decision circuit 317 compares the amplified signal with a threshold value. When the amplified signal is equal to or larger than the threshold value, the decision circuit 317 outputs a digital signal "1" to the wavelength control system 31; when the amplified signal is smaller than the threshold value, it outputs a digital signal "0" to the wavelength control system 31. In this manner, the wavelength control system 31 detects a channel of the wavelength corresponding to "1" output from the decision circuit 317, in correspondence with the control voltage supplied from the wavelength control system 31 to the wavelength variable filter drive circuit 55.

Furthermore, an LD 47 is a light source of the packet communication system, and its wavelength band is, e.g., 1.3 µm. An LD drive circuit 48 is a current source which modulates the LD 47 by a signal selected by the signal selection switch 318. In this embodiment, since the packet communication system does not perform any high-density wavelength division multiplexing, the LD 47 is directly intensity-modulated.

The signal selection switch 318 selects one of a transmission signal of the packet communication system from the terminal equipment, and a wavelength control packet from the wavelength control system 31, and inputs the selected signal to the LD drive circuit 48. In this case, the wavelength control packet is preferentially selected. When two signals including data in the data format of the wavelength control packet shown in FIG. 3 above are simultaneously input, a transmission signal from the terminal equipment is saved in the internal buffer of the wavelength control system 31, and is transmitted after the wavelength control packet is transmitted.

A light-receiving element 510 and a receiving circuit 511 are used for receiving a signal of the packet communication system.

An optical wavelength multiplexer 514 wavelength-multiplexes an optical signal of the WDM communication system in the 1.5 µm band, and an optical signal of the packet communication system in the 1.3 µm band, and outputs the multiplexed signal onto the optical fiber. On the other hand, an optical wavelength demultiplexer 513 demultiplexes an optical signal input from the optical fiber on the basis of wavelength bands, inputs an optical signal of the 1.5 µm band to the wavelength variable filter 53, and inputs an optical signal of the 1.3 µm band to the light-receiving element 510.

In this embodiment, all the communication nodes may detect the wavelength arrangement using their wavelength variable filters 53 in a non-receiving state. That is, the wavelength of the wavelength variable filter 53 is swept over the entire wavelength range of the WDM communication system, and the output from the decision circuit 317 at that time is monitored, thereby detecting the wavelength arrangement of the respective channels.

Since one of communication nodes in a non-receiving state serves as a wavelength controlling part in a steady state, and a communication node which receives a channel that started light emission or a channel that stopped light emission (just before starting to receive or just after finishing to receive) in an unsteady state (when a certain channel starts light emission and stops light emission), the timings of detection of the wavelength arrangement and transmission of a wavelength control packet are determined as follows. Note that "just before starting to receive" indicates a period from an unsteady state upon start of light emission until a steady state is set, and "just after finishing to receive" indicates a period from an unsteady state caused when a certain communication node stops light emission until a steady state is set.

The timings of detection of the wavelength arrangement and transmission of a wavelength control packet will be described below.

In a state just before starting to receive or just after finishing to receive, after the wavelength arrangement immediately after this state is detected, <1> when the own node satisfies a condition (to be described later) for transmission of a wavelength control packet, the wavelength control packet is transmitted ΔT after the detection of the wavelength arrangement, and next detection of the wavelength arrangement is performed T1da–ΔT (ΔT is the time required between the detection of the wavelength arrangement and transmission of a wavelength control packet when the wavelength control packet is to be transmitted, and is shorter than T1da; for example, ΔT=0.5×T1da) after the transmission. Thereafter, the detection of the wavelength arrangement and the transmission of the wavelength control packet are performed at T1da periods until the own node retires the wavelength controlling part. <2> If the own node does not satisfy the condition for transmission of a wavelength control packet, since the node receives a wavelength control packet transmitted from another node, it is controlled to detect the wavelength arrangement T1db after reception of the wavelength control packet transmitted from the other node. Note that T1db is a predetermined period of time (e.g., 2×T1da) longer than T1da. As long as another node just before starting to receive or just after finishing to receive serves as a wavelength controlling part and transmits wavelength control packets at T1da intervals, the own node receives the next wavelength control packet during a period T1db from reception of one wavelength control packet until the next detection of the wavelength arrangement. For this reason, as long as the other node transmits wavelength control packets at T1da intervals, the own node performs neither detection of the wavelength arrangement nor transmission of a wavelength control packet. When the other node stops transmission of a wavelength control packet while the own node is in a state just before starting to receive or just after finishing to receive, and still another node in a state just before starting to receive or just after finishing to receive does not transmit any wavelength control packet, the condition for transmission of a wavelength control packet is satisfied, and thereafter, operations <1> are performed. In this case, the condition for transmission of a wavelength control packet in the state just before starting to receive or just after finishing to receive is:

"(1) a case wherein no wavelength control packet is received during ΔT after detection of the wavelength arrangement".

In a non-receiving state other than the above-mentioned state, <3> if the own node satisfies a condition (to be described later) for transmission of a wavelength control packet, a wavelength control packet is transmitted ΔT after detection of the wavelength arrangement, and the wavelength arrangement is detected T1dc–ΔT (for example, T1dc=2×T1da) after the transmission. <4> If the own node does not satisfy the condition for transmission of a wavelength control packet, since the node receives a wavelength control packet transmitted from another node, it is controlled to detect the wavelength arrangement T1dd after the reception of the wavelength control packet transmitted from the other node. Note that T1dd is a predetermined period of time (e.g., 4×T1da) longer than T1dc. In this case, the condition for transmission of a wavelength control packet in a non-receiving state other than the state just before starting to receive or just after finishing to receive is:

"(2) a case wherein no wavelength control packet is received during ΔT after the detection of the wavelength arrangement". Furthermore, the following condition is preferably added since an unnecessary wavelength control packet can be prevented from being generated:

"(3) a case wherein stagger of the wavelength arrangement is detected upon detection of the wavelength arrangement.

When condition (2) is adopted but condition (3) is not adopted as the condition for transmission of a wavelength control packet in a non-receiving state other than the state just before starting to receive or just after finishing to receive, a node which is executing operations <3> performs detection of the wavelength arrangement and transmission of a wavelength control packet at T1dc intervals until a node just before starting to receive or just after finishing to receive is generated, and a node which is executing operations <4> receives the next wavelength control packet during a period T1dd from reception of one wavelength control packet until the next detection of the wavelength arrangement as long as another node serves as a wavelength controlling part and transmits wavelength control packets at T1da or T1dc intervals. For this reason, the node which is executing operations <4> performs neither the detection of the wavelength arrangement nor transmission of a wavelength control packet as long as the other node transmits wavelength control packets at T1da or T1dc intervals. When the other node stops transmission of a wavelength control packet, and still another node does not transmit any wavelength control packet, since the own node satisfies the condition for transmission of a wavelength control packet, it performs operations <3> thereafter. Of course, if the own node is set in the state just before starting to receive, it performs operations <1> or <2>. When conditions (2) and (3) are adopted as the condition for transmission of a wavelength control packet in a non-receiving state other than the state just before starting to receive or just after finishing to receive, a node which is executing operations <3> detects the wavelength arrangement but does not transmit any wavelength control packet unless it detects stagger. Therefore, if no stagger is generated while a certain node is executing operations <3>, one of nodes which are executing operations <4> may satisfy the condition for transmission of a wavelength control packet, and at that time, the node starts operations <3>.

Note that the staggered state of the wavelength arrangement is included in a steady state, and means a state shown in (b) of FIG. 2, i.e., a state wherein the wavelength arrangement is staggered from the wavelength arrangement in which wavelengths are arranged at predetermined wavelength separations with reference to ch1. This stagger is detected on the basis of the relationship between the output from the above-mentioned decision circuit 317 and the voltage to be supplied to the wavelength variable filter drive circuit 55.

When the respective communication nodes are controlled in this manner, one of communication nodes in a non-receiving state serves as a wavelength controlling part in a steady state, and transmits wavelength control packets at T1dc (or more) intervals by operations <3> above, thus performing simultaneous FCS control. At this time, if the node which is executing operations <3> ceases to transmit wavelength control packets for some reason, one of other nodes which are executing operations <4> above serves as a wavelength controlling part, and starts operations <3> above. If a node in a state just before starting to receive or just after finishing to receive is generated, the system enters an unsteady state, and the node in the state just before starting to receive or just after finishing to receive serves as a wavelength controlling part, and transmits wavelength control packets at T1da intervals by operations <1> above. Since T1da<T1db, it is guaranteed that other nodes do not become a wavelength controlling part until the node which is executing operations <1> ends transmission of a wavelength control packet, as described above. Also, since T1dc<T1dd, it is guaranteed that other nodes do not become a wavelength controlling part until the node which is executing operations <3> ends transmission of a wavelength control packet or another node is set in the state just before starting to receive or just after finishing to receive. Especially, since T1da<T1dc, the wavelength shift interval can be shortened in a state wherein the node just before starting to receive or just after finishing to receive is generated, i.e., in an unsteady state, and hence, the unsteady state can be eliminated quickly. Therefore, the available wavelength band can be efficiently utilized. In a steady state in which the wavelengths need not be shifted quickly, the frequency of detection of the wavelength arrangement and transmission of wavelength control packets can be decreased, and the load on the wavelength control can be reduced.

An example shown in FIG. 9 will be explained below.

In the example shown in FIG. 9, the state of the system is classified into five modes in correspondence with the ways of transition to steady and unsteady states.

I) T1p1 to T1p4. The wavelength arrangement is in a steady state. A communication node X as one of those in a non-receiving state is transmitting a wavelength control packet. As described above, the transmission interval is a minimum of T1dc.

II) T1p5 to T1p7. A channel A starts light emission during the interval between T1p4 and T1p5, and the wavelength arrangement becomes an unsteady state. A communication node A which should receive the channel A receives a reception request via the packet reception system during the interval between T1p4 and T1p5, and becomes a state just before starting to receive. Hence, the node A performs operations <1> above, and sets the interval between transmission/reception of a wavelength control packet and detection of the wavelength arrangement to be T1da−ΔT, thus transmitting wavelength control packets at T1da periods. With the simultaneous FCS control using the wavelength control packets, the wavelength separation between the wavelength of the channel A and that of the neighboring channel is set to be Δλ, and the wavelength arrangement is recovered to a steady state. The communication node A that has detected that the wavelength arrangement had become a steady state adjusts the wavelength variable filter to the wavelength of the channel A. Thereafter, the communication node A informs, via the packet communication system, the communication node as the source of the channel A of a message indicating that it is ready to receive, and starts reception using the channel A. The communication node A retires the wavelength controlling part since it has started reception.

III) T1p8 to T1p10. The communication node X transmits wavelength control packets as in I).

IV) T1p11 to T1p13. A channel B stops light emission during the interval between T1p10 and T1p11, and the wavelength arrangement becomes an unsteady state. A communication node B that received the channel B is set in a state just after finishing to receive, and performs operations <1> above to set the interval between transmission/reception of a wavelength control packet and detection of the wavelength arrangement to be T1da. As a result, the communication node B transmits wavelength control packets at T1da periods, and an unoccupied wavelength region formed when the channel B stops light emission is reduced under the simultaneous FCS control using the wavelength control packets. Hence, the wavelength arrangement is recovered to a steady state. The communication node B that has detected that the wavelength arrangement had become a steady state sets the interval between transmission/reception of a wavelength control packet and detection of the wavelength arrangement to be T1dc.

V) T1p13 to T1p15. The communication node X transmits wavelength control packets as in I).

When communications are made between one node and multiple nodes in the WDM communication system, although the number of channels that can be used of the WDM communication system is smaller than the number of communication nodes, there may be no communication node in a non-receiving state. In this situation, there is no communication node serving as a wavelength controlling part, and crosstalk between adjacent channels may occur. In such case, a communication node which detects the crosstalk stops reception, and supplies a message indicating that it stops reception to the source communication node via the packet communication system, and then, takes the wavelength controlling part. After the stagger of the wavelength arrangement is corrected, the communication node adjusts the wavelength of the optical filter to the original reception channel, supplies a message indicating that it is ready to receive to the source node, and restarts reception.

In a communication node which serves as an information source in communications between one node and multiple nodes, its receiver rarely receives any data. For this reason, such communication node may serve as a wavelength controlling part by transmitting information via the WDM communication system and transmitting wavelength control packets via the packet communication system.

In this embodiment, the wavelength controlling part can be switched without any communications via the packet communication system, thus preventing an unnecessary traffic on the packet communication system from being generated.

[Fourth Embodiment]

In this embodiment, the wavelength controlling part is switched using communications via the packet communication system. When the network is activated, one communication node serves as a wavelength controlling part, and issues a notification for ending the wavelength controlling part to other communication nodes before the own node is set in a receiving state. Each of communication nodes in a non-receiving state that received the notification issues a notification for being able to take the wavelength controlling part. The communication node which currently serves as the wavelength controlling part selects one of communication nodes that issued notifications for being able to take the wavelength controlling part, and issues a notification for switching the wavelength controlling part to the selected communication node via the packet communication system. The communication node that received the notification for switching the wavelength controlling part then takes the wavelength controlling part. When this communication node is set in a receiving state, the wavelength controlling part is switched in the same procedure as described above.

The arrangement of the WDM communication system according to this embodiment is the same as that shown in FIG. 8. Also, the arrangement of each communication node is the same as that shown in FIG. 10. Hence, a detailed description thereof will be omitted.

Figure 11:
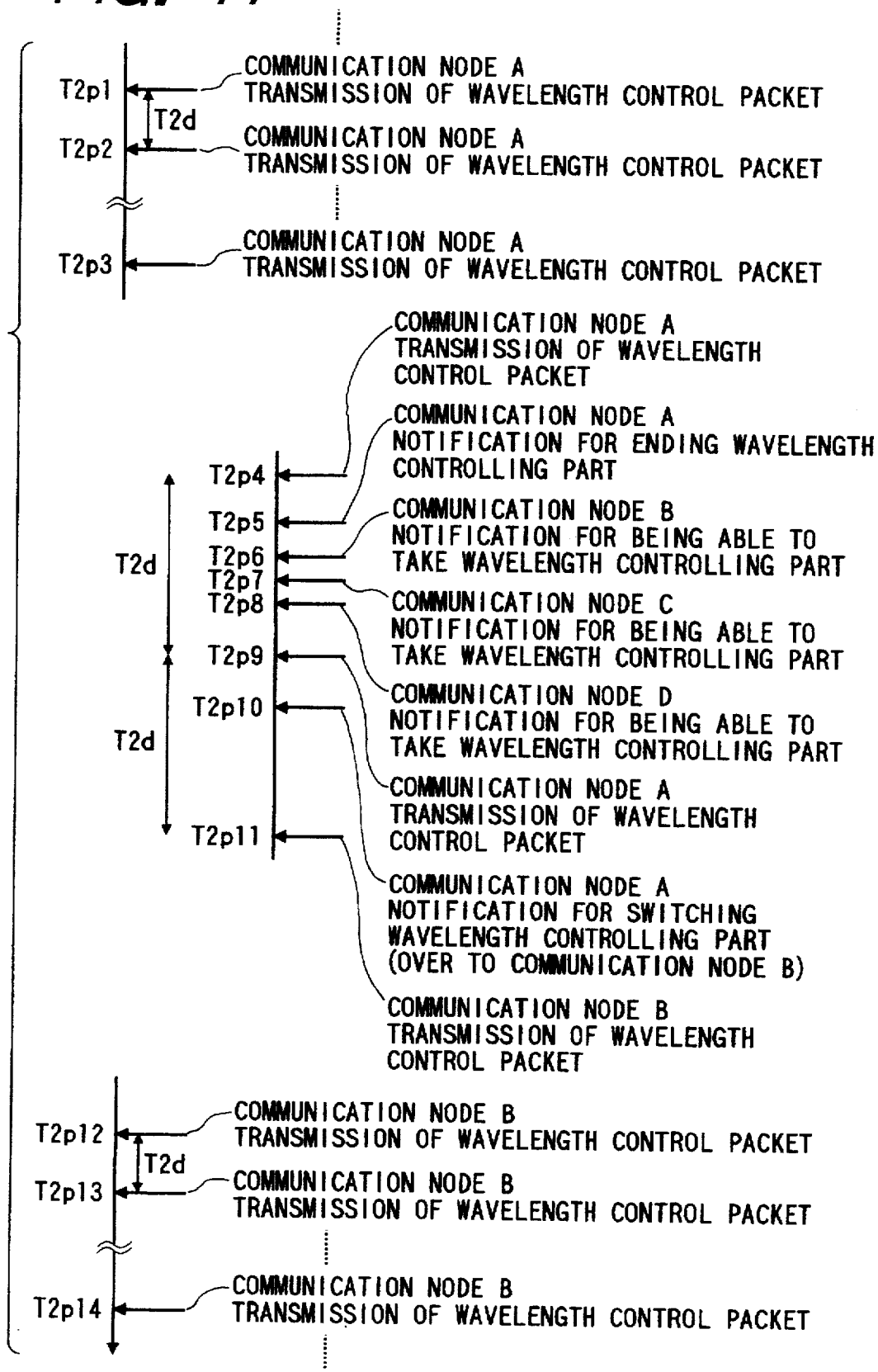
FIG. 11 is a chart showing an example of the operation of the wavelength controlling part in the wavelength control method according to the third embodiment of the present invention.

FIG. 11 shows an example of switching the wavelength controlling part in this embodiment. The time axis extending in the up-and-down direction in FIG. 11 plots the transmission timings of wavelength control packets (T2p1 to T2p14). In FIG. 11, a portion from T2p4 to T2p11 is illustrated in an enlarged scale since packet communications for switching are performed densely. A communication node serving as a wavelength controlling part transmits a wavelength control packet only when stagger of the wavelength arrangement is detected (including an unsteady state). Consequently, the shortest transmission interval of wavelength control packets is T2d. FIG. 11 shows a state wherein the wavelength controlling part is switched from a communication node A to a communication node B.

In this embodiment, the wavelength controlling part can be switched reliably. Hence, even when the wavelength arrangement is staggered in a steady state, the stagger can be eliminated, and crosstalk between adjacent channels can be prevented.

Referring to FIG. 11, at timings T2p1 to T2p4, a communication node A that serves as a wavelength controlling part sweeps the wavelength of an optical signal in the transmission path of the reception optical fiber to detect channel numbers and their wavelengths, and transmits control information associated with maintenance and shift of the wavelengths as a wavelength control packet as in the operation described in the third embodiment. Before timing T2p5, since an event that requires the communication node A to receive information has occurred, the communication node A transmits a notification for ending the wavelength controlling part, which notification indicates that the own node ends the wavelength controlling part, onto the packet communication system. In response to this end notification, communication nodes B, C, and D issue notifications for being able to take the wavelength controlling part to the communication node A via the packet communication system at timings T2p6, T2p7, and T2p8, respectively. At timing T2p9, the communication node A transmits a wavelength control packet as in a normal state. Furthermore, the communication node A selects the communication node B from those which sent notifications for being able to take the wavelength controlling part were received, and transmits a notification for switching the wavelength controlling part to the communication node B via the packet communication system. Then, the communication node B receives the switching notification via the packet communication system, sweeps the wavelength of its own wavelength variable filter to detect the wavelength arrangement of optical signals in the WDM communication system, and transmits, as a wavelength controlling part, a wavelength control packet onto the packet communication system in the same data format of the wavelength control packet that transmitted from the communication node A, at timing T2p11. At timings T2p12 to T2p14, the communication node B continues to transmit wavelength control packets until it becomes a receiving state.

[Fifth Embodiment]

In this embodiment, a method of avoiding collision between a transmission packet from a terminal equipment and a wavelength control packet in the transmitter of the packet communication system when a communication node operates as a wavelength controlling part will be explained.

In the arrangement of the communication node shown in FIG. 10, a route extending from the wavelength control system 31 to the LD drive circuit 48 via the signal selection switch 318 has been exemplified as the transmission route of a wavelength control packet. Alternatively, data of a wavelength control packet generated by the wavelength control system 31 may be temporarily supplied to a terminal equipment, which may appropriately arrange the data of the packet of the packet communication system as a wavelength controlling part and data to be transmitted from the terminal equipment itself via the packet communication system, and may then directly input these data as a transmission signal to the LD drive circuit 48. In this case, the signal selection switch 318 may be omitted.

Also, other constituting elements are not limited to those described in the third to fifth embodiments as long as they have the same functions. The same applies to a system constituted by some constituting elements.

In the above embodiments, all the communication nodes have the arrangement of the wavelength control packet system. However, in terms of cost requirements of the system, experience, and the like, all the communication nodes need not have such arrangement, but only some of communication nodes may have the arrangement of the wavelength control packet system. In this case, communication nodes that can serve as a wavelength controlling part are limited to these some nodes. However, this embodiment is more effective in terms of communication probability, communication stability, and communication reliability than in the first or second embodiment in which one or two wavelength control nodes are arranged.

As described above, in the third to fifth embodiments, since a communication node in a non-receiving state takes the wavelength controlling part, each communication node need not comprise both a wavelength detection means for reception (wavelength filter) and a wavelength detection means for detecting the wavelength arrangement, and the need for a special-purpose wavelength control node described in the first and second embodiment can be obviated. According to the third to fifth embodiments, especially, in an unsteady state in which wavelength control must be frequently performed, the wavelength controlling part can reliably transmit wavelength control packets.

According to the third embodiment, since the wavelength controlling part can be switched without any communications via the packet communication system, unnecessary traffic can be prevented from being generated on the packet communication system. Furthermore, according to the third to fifth embodiments, since the wavelength controlling part can be reliably switched, even when the wavelength arrangement is staggered in a steady state, the stagger can be reliably eliminated, and crosstalk between adjacent channels can be prevented.

[Sixth Embodiment]

In this embodiment, two wavelength control nodes are set in the network of the WDM communication system, and even when one wavelength control node according to the first or second embodiment fails, the remaining wavelength control node can transmit wavelength control packets to perform wavelength control of the communication nodes.

In this embodiment, each wavelength control node comprises a transmission/reception function of the packet communication system. Of the two wavelength control nodes, one node operates actually, and the other node serves as a sub node. The wavelength control node which is operating actually continues to transmit wavelength control packets at predetermined time intervals. The sub wavelength control node monitors the transmission interval of wavelength control packets from the wavelength control node which is operating actually, and determines that the wavelength control node which is operating actually has failed when the intervals becomes equal to or longer than a predetermined time period. Then, the sub wavelength control node operates instead, and starts transmission of wavelength control packets.

This embodiment will be described in detail below with reference to the accompanying drawings.

Figure 12:
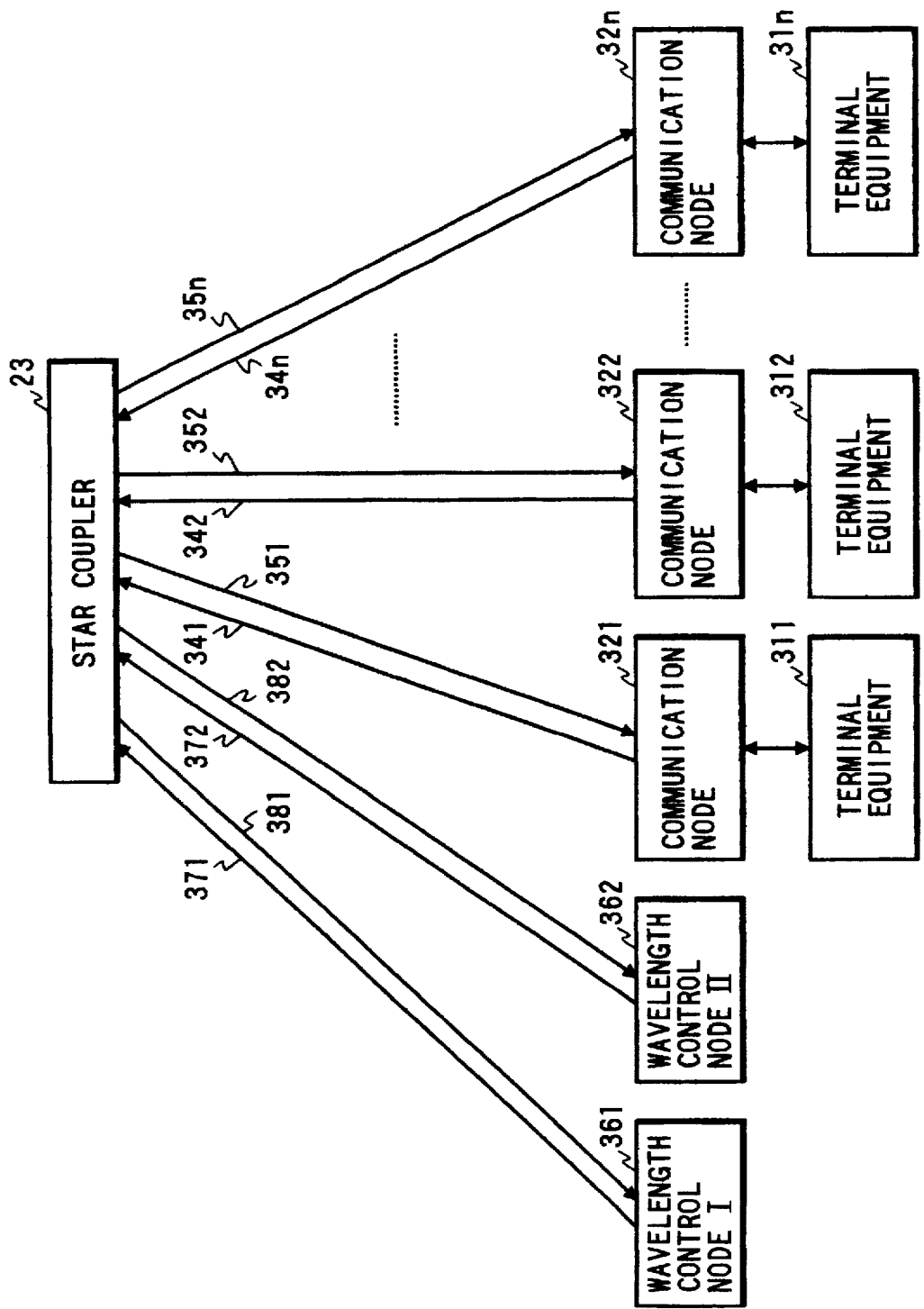
FIG. 12 is a block diagram showing the arrangement of a WDM communication system according to the sixth embodiment of the present invention.

FIG. 12 is a block diagram of a WDM communication system to which this embodiment is applied. The difference from FIG. 1 is that two wavelength control nodes 361 and 362 are arranged, and are connected to a star coupler 23 via four optical fibers 371, 372, 381, and 382.

The wavelength control node I 361 in operation repeats a cycle of a series of operations below at predetermined periods T3da:

(1) standby;
(2) detection of the wavelength arrangement of the WDM communication system;
(3) calculation of the shift directions of the wavelengths of transmitters of each respective communication nodes 321 to 32n so as to set constant wavelength separations between adjacent channels of the communication nodes; and
(4) transmission of a wavelength control packet.

Note that (1) standby assures the wait time until a wavelength control packet is received by all the communication nodes in the network, and these communication nodes complete shift of their transmission wavelengths.

Since the arrangement of each of the wavelength control nodes 361 and 362 is the same as that described above with reference to FIG. 4, a detailed description thereof will be omitted. Also, since the packet communication system and the WDM communication system used by the wavelength control nodes I 361 and II 362 and the communication nodes are the same as those used in the first embodiment, and the arrangement of each of the communication nodes 321 to 32n is the same as that described above with reference to FIG. 5, refer to the description in the first embodiment in association with a detailed description thereof.

Figure 13:
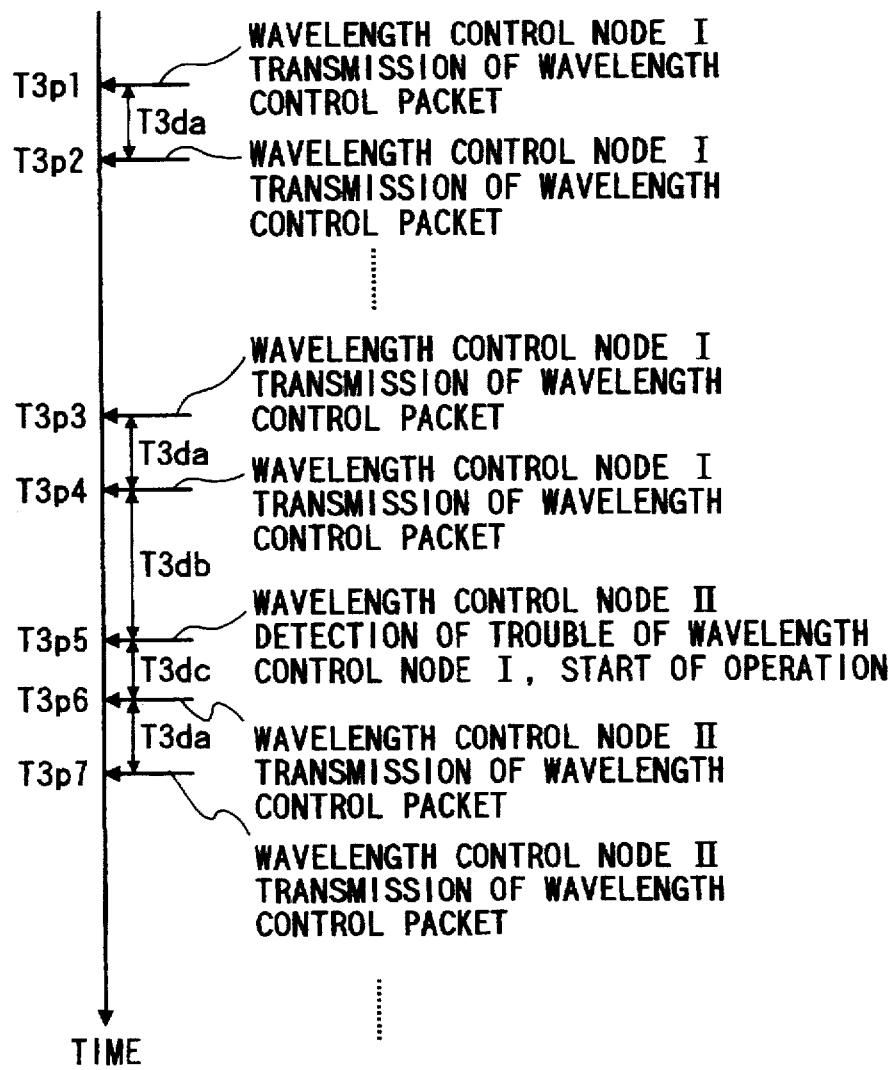
FIG. 13 is a chart showing an example of the operation of the wavelength control method according to the sixth embodiment of the present invention.

FIG. 13 is an explanatory view showing an example of the operation of the wavelength control nodes in the sixth embodiment. The time axis extending in the up-and-down direction in FIG. 13 plots the timings of the operations (transmission of a wavelength control packet and detection of trouble) of the wavelength control nodes. T3p1 to T3p4, T3p6, and T3p7 correspond to the transmission timings of wavelength control packets, and T1p5 corresponds to the detection timing of trouble. On the other hand, T3da represents the transmission interval of wavelength control packets when the wavelength control node I 361 operates normally, T3db represents the interval based on which the sub wavelength control node II 362 determines that the wavelength control node in operation has caused a trouble, and T3dc represents the time required from when the sub wavelength control node II 362 detects the trouble of the wavelength control node I 361 in operation until it transmits the first wavelength control packet. The time intervals T3da and T3db have margins for a packet transmission delay owing to the specific topology or protocol involved.

The wavelength control node I 361 in operation repeats detection of the wavelength arrangement of the WDM communication system, calculation of the shift directions of the wavelengths of transmitters in the communication nodes to set constant wavelength separations between adjacent transmission channels of the communication nodes, and transmission of a wavelength control packet at the predetermined periods T3da. With these operations, wavelength control packets are transmitted onto the network at the predetermined intervals T3da. In the example shown in FIG. 13, wavelength control packets are transmitted at the T3da intervals from timing T3p1 to T3p4.

The sub wavelength control node II 362 counts the transmission time of a wavelength control packet of the wavelength control node I using the internal counter of a wavelength control system 41, and detects a trouble of the wavelength control node I in operation on the basis of the interval between the transmission times. The sub wavelength control node II 362 determines that the wavelength control node I 361 in operation has caused a trouble when it does not receive the next wavelength control packet within the time period T3db after it received a certain wavelength control packet, and starts the operations of the main wavelength control node instead. In the example shown in FIG. 13, since no wavelength control packet is transmitted onto the optical fiber during the time period T3db between timings T3p4 and T3p5, the sub wavelength control node II 362 determines that the wavelength control node I in operation has failed. Since the sub wavelength control node II that received a wavelength control packet at timing T3p4 does not receive any wavelength control packet until timing T3p5, it starts the operations of the main wavelength control node. The wavelength control node II performs detection of the transmission wavelengths of the respective communication nodes in the optical fiber, and calculation of the shift directions of the wavelengths, and thereafter, transmits a wavelength control packet at timing T3p6 (T3db+T3dc after T3p4). T3dc corresponds to the time period obtained by subtracting the "standby" duration from the series of operations of the wavelength control node II (T3dc<T3da). Thereafter, the wavelength control node II repeats the operations of the main wavelength control node, and transmits wavelength control packets at the T3da intervals (timings T3p6 and T3p7 in FIG. 13).

Note that the difference between the main and sub wavelength control nodes is a formal one, and their arrangements and operations are not different from each other. After the start of operations, the sub wavelength control node II serves as a main one.

The wavelength control packet to be transmitted from the wavelength control node to the communication nodes may have the data format shown in FIG. 3 used in the first embodiment, or may have a sender address appended as in other packets. When the sender address is appended, a network manager can determine the faulty wavelength control node by monitoring the sender address of the wavelength control packet. In the example shown in FIG. 13, the sender of the wavelength control packets from timing T3p1 to T3p4 is the wavelength control node I, and that of wavelength control packets at timings T3p6 and T3p7 is the wavelength control node II. Since the sender address changes between timings T3p4 and T3p6, the manager can determine that the wavelength control node I that operated until T3p4 has failed since then. Hence, the manager can disconnect the wavelength control node I from the network, and can repair and re-connect it to the network, so as to prepare for a trouble of the wavelength control node II.

In the above embodiment, the two wavelength control nodes are arranged. Alternatively, three or more wavelength control nodes may be arranged. In this case, since two or more sub wavelength control nodes are used, the system reliability can be improved, resulting in a preferred arrangement.

[Seventh Embodiment]

In this embodiment as well, the wavelength control packets have a transmission/reception function of the packet communication system as in the sixth embodiment. The two wavelength control nodes operate concurrently, and alternately transmit wavelength control packets when they normally operate. Since the arrangements of the WDM communication system, the wavelength control node, and the communication node are the same as those in the sixth embodiment, a detailed description thereof will be omitted.

Figure 14:
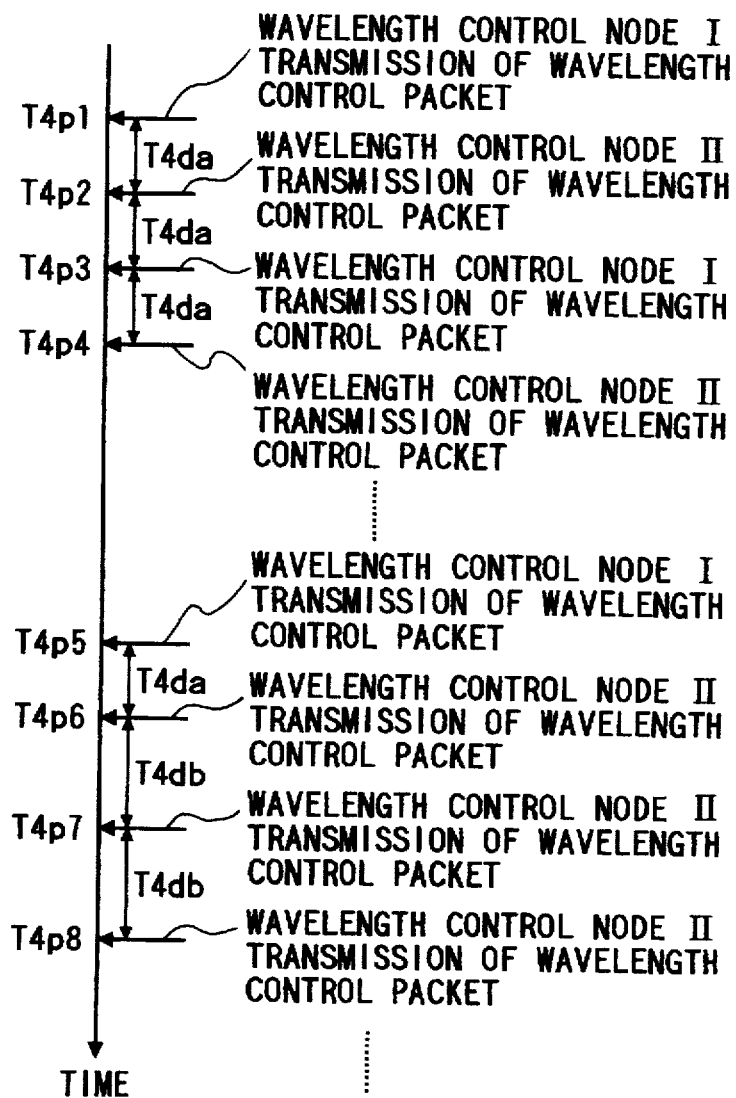
FIG. 14 is a chart showing an example of the operation of the wavelength control method according to the seventh embodiment of the present invention.

This embodiment will be described below with reference to FIG. 14. FIG. 14 is an explanatory view showing an example of the operations of the wavelength control nodes in the seventh embodiment. FIG. 14 shows a state wherein wavelength control packets are transmitted. The time axis extending in the up-and-down direction in FIG. 14 plots the timings of the operations (transmission of a wavelength control packet) of the wavelength control nodes. T4p1, T4p2, . . . , T4p7 represent the transmission timings of wavelength control packets. On the other hand, T4da represents the transmission interval of wavelength control packets when both the wavelength control nodes I 361 and II 362 operate normally, and T4db represents the transmission interval of wavelength control packets when either of the two wavelength control nodes, in this case, the wavelength control node I, has caused a trouble, and only the other wavelength control node, in this case, the wavelength control node II, is in operation. Both the intervals T4da and T4db have margins for a packet transmission delay owing to the specific topology or protocol involved.

In this embodiment, in a normal state, the two wavelength control nodes operate concurrently and alternately output wavelength control packets. For this reason, the operation cycle of the wavelength control node is determined to have the reception timing of a wavelength control packet as the start point, and two different values are set in its "standby" time. That is, T4da is the "standby" time of the operation cycle starting from reception of a wavelength control packet transmitted from the wavelength control node other than the own node, and T4db is the "standby" time of the operation cycle starting from reception of a wavelength control packet transmitted from the own node. When a wavelength control packet is received during the operation cycle, the node resets its operation, and starts a new operation cycle. Since T4da<T4db, the two wavelength control nodes can alternately transmit wavelength control packets in a normal state.

In the example shown in FIG. 14, from timing T4p1 to timing T4p6, the wavelength control nodes I and II alternately transmit wavelength control packets at intervals T4da. The wavelength control node I causes a trouble during the interval between timings T4p6 and T4p7, and fails to transmit any wavelength control packet T4da after the timing T4p6. Hence, the operation cycle of the wavelength control node II is not reset, and the wavelength control node II transmits a wavelength control packet at timing T4p7 T4db after timing T4p6. Thereafter, since the operation cycle of the wavelength control node II is not reset by a wavelength control packet transmitted from the wavelength control node I, wavelength control packets are transmitted from the wavelength control node II at T4db intervals (T4p8 in FIG. 14).

The wavelength control node that has caused a trouble can be detected by monitoring the sender address of a wavelength control packet as in the sixth embodiment. In the example shown in FIG. 14, wavelength control packets transmitted from the two wavelength control nodes are alternately received from timing T4p1 to T4p6, and after timing T4p7, wavelength control packets having the sender address (the address of the wavelength control node II) appended are received from only the wavelength control node II. Thus, it is determined that the wavelength control node I has caused a trouble after timing T4p7.

When a network manager recognizes the trouble of the wavelength control node I, he or she can disconnect and repair the wavelength control node I and can re-connect it to the network, so that the two wavelength control nodes alternately transmit wavelength control packets again.

In the above embodiment, since the two wavelength control nodes concurrently operate and alternately transmit packets, equivalent loads can be exerted on the two nodes, and these nodes are expected to cause troubles at equal frequencies, resulting in good balance of the system.

[Eighth Embodiment]

In this embodiment, a wavelength control node comprises only a transmission function of the packet communication system. The arrangements of the WDM communication system, the wavelength control node, and the communication node are the same as those in the sixth embodiment. Of the two wavelength control nodes, one node actually operates as a main node, and the other node serves as a sub node, thus performing the same operations of the packet communication system as in the seventh embodiment. The wavelength control node in operation continues to transmit wavelength control packets at predetermined time intervals T5. The sub wavelength control node performs only detection of wavelengths, and monitors the wavelength arrangement in the transmission path. In the following two cases, it is determined that the main wavelength control node in operation has failed, and the sub wavelength control node starts the operations of the main wavelength control node instead, i.e., starts transmission of wavelength control packets.

(1) When the wavelength separation of adjacent channels of the transmission wavelengths of the communication nodes becomes smaller than a predetermined ch separation (e.g., ⅔ the ch separation), and (2) when the wavelength separation of adjacent channels of the transmission wavelengths of the communication nodes is larger than the predetermined ch separation (e.g., twice), and remains the same during an interval (e.g., five times of T5) sufficiently longer than the time interval T5, the sub wavelength control node transmits wavelength control packets as the main wavelength control node, thereby controlling the transmission wavelengths of the communication nodes.

Note that the wavelength control node that caused a trouble can be detected in the same manner as in the sixth embodiment.

According to the eighth embodiment, since the wavelength control node transmits wavelength control packets on the basis of the detected wavelength arrangement irrespective of the reception timings of wavelength control packets, it need not have any reception function of the packet communication system, resulting in a simple arrangement.

In the sixth embodiment, the trouble of the main wavelength control node may be detected by a method other than that based on the transmission interval of wavelength control packets. For example, the sub wavelength control node may monitor the operating state of the main wavelength control node by communicating with it at predetermined time intervals via the packet communication system.

On the other hand, the seventh embodiment may be arranged such that the two nodes do not alternately transmit wavelength control packets. For example, the "standby" time of the operation cycle of the wavelength control node I is set to be shorter than that of the wavelength control node II, so that only the wavelength control node I transmits wavelength control packets while it is in operation.

Furthermore, in the eighth embodiment the wavelength separations and times used for detecting the trouble of the main wavelength control node may be set to be other values as long as they do not disturb the operations of the communication system.

According to the sixth to eighth embodiments, even when one wavelength control node causes a trouble, the WDM communication system can operate normally. Also, according to the sixth to eighth embodiments, the wavelength control function can be automatically switched to the other wavelength control node, and the WDM communication system can operate normally. When the wavelength control node that caused a trouble is disconnected from the network, is repaired, and is re-connected to the network, the operations of the network need not be stopped.

[Ninth Embodiment]

In the above embodiments, the wavelength control node connected to the network system or the communication node that serves as a wavelength controlling part transmits wavelength control packets. However, the present invention is not limited to such specific arrangements. This embodiment adopts an arrangement in which a wavelength control packet generation means is arranged in the vicinity of a star coupler.

FIG. 3 in *Journal of Lightwave Technology*, Vol. 11, No. 5/6, p.1089, discloses an arrangement in which each communication node sends a connection request to a center node constituted by an optical coupler and a control circuit, and the request is processed by the control circuit to assign a wavelength (optical frequency). In contrast to this, this embodiment realizes high-density wavelength division multiplexing using a center node having an optical coupler and a means for FCS control, without absolutely fixing wavelengths.

Figure 15:
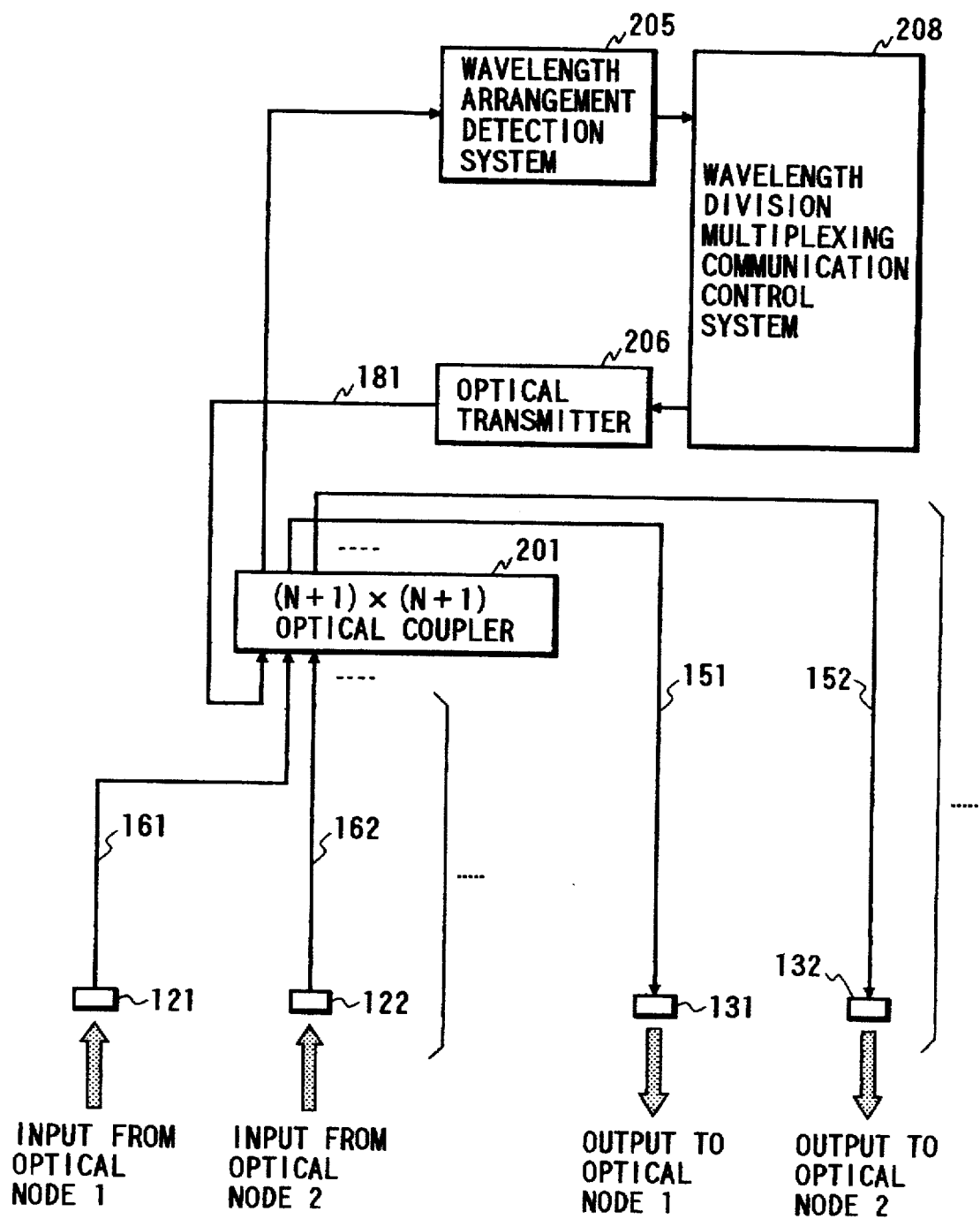
FIG. 15 is a block diagram showing the arrangement of an optical center node according to the ninth embodiment of the present invention.

FIG. 15 shows a center node used in this embodiment. This center node comprises an optical coupler 201 corresponding to the star coupler used in the above embodiments, a wavelength arrangement detection system 205 for performing FCS control, an optical transmitter 206, and a WDM communication control system 208.

Figure 16:
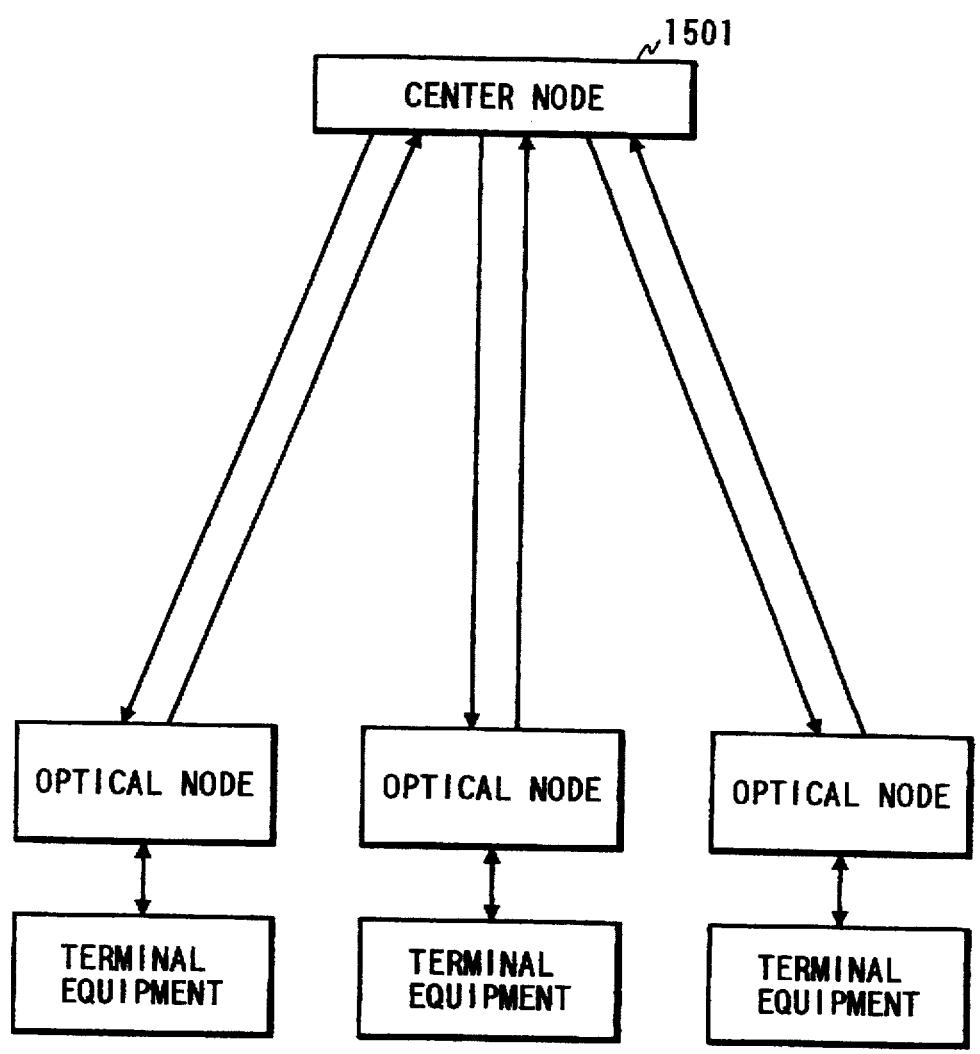
FIG. 16 is a block diagram showing the arrangement of a WDM communication system according to the ninth embodiment of the present invention.

FIG. 16 shows the arrangement of a network in this embodiment, and communication nodes are connected to a center node 1501 shown in FIG. 15.

In this embodiment, the wavelength arrangement detection system in the center node comprises a wavelength variable filter, a light-receiving element for receiving an optical signal having the wavelength transmitted through the wavelength variable filter, and a decision circuit for deciding the received optical signal, as in the above embodiments, and detects the wavelength arrangement. The WDM communication control system 208 generates, based on the detection result of the wavelength arrangement, a wavelength control packet for FCS control for shifting the wavelengths, maintaining the wavelengths, and so on, and transmits the packet to the optical transmitter 206. Each communication node controls the wavelength of transmission light of the own node on the basis of the received wavelength control packet, thus realizing high-density wavelength division multiplexing. In this arrangement as well, each communication node can attain FCS control without arranging any wavelength arrangement detection means independently of a wavelength selection means (wavelength variable filter) for receiving a wavelength-multiplexed signal.

[Tenth Embodiment]

As in the ninth embodiment, when the wavelength control function is assigned to a portion where optical signals from the respective communication nodes are concentrated, i.e., to the center node, optical path control can be performed when the wavelengths of optical signals transmitted from the communication nodes cause a problem such as crosstalk.

Figure 17:
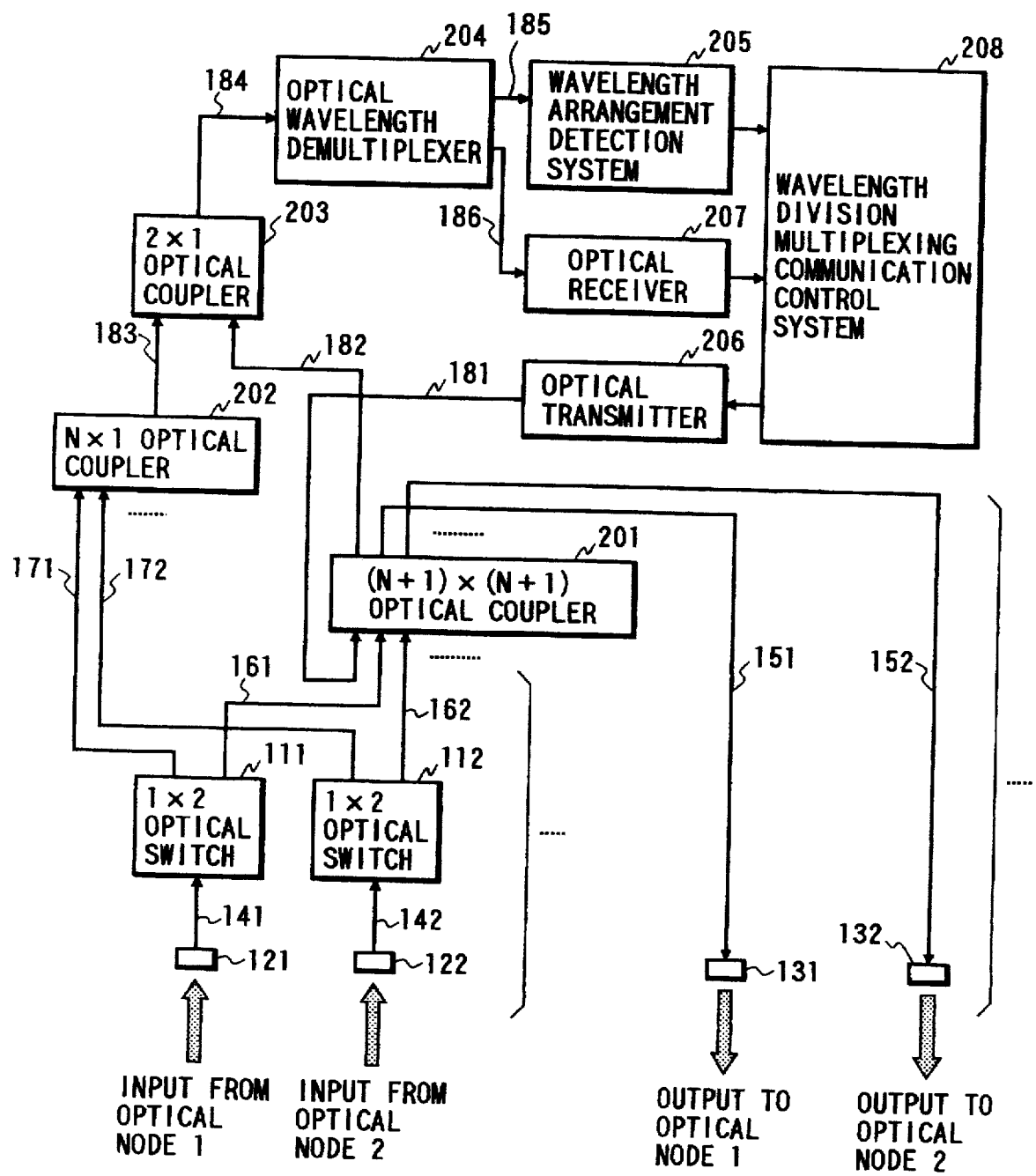
FIG. 17 is a block diagram showing the arrangement of a center node according to the tenth embodiment of the present invention.

FIG. 17 is a block diagram of an optical center node that performs the above-mentioned optical path control. Assume that the number of communication nodes or optical nodes is N. Referring to FIG. 17, an (N+1)×(N+1) optical coupler 201 in the optical center node distributes optical signals input from (N+1) optical input ports to (N+1) optical output ports. That is, the optical coupler 201 receives optical signals from (N+1) optical fibers including the output from an optical transmitter 206 in the optical center node and optical signals from the respective communication nodes, and distributes them to output (N+1) optical signals toward an optical receiver 207 in the optical center nodes and the respective communication nodes. The (N+1)×(N+1) optical coupler 201 can comprise, e.g., a quartz-based optical waveguide formed on a silicon substrate, described in, for example, reference [C. Dragone, C. H. Henry, I. P. Kaminow, and R. C. Kistler: "Efficient multichannel integrated optics star coupler on silicon", *IEEE Photonics Technol. Lett.*, Vol. 1, No. 8, pp. 241–243 (August 1989)].

An N×1 optical coupler 202 wavelength-multiplexes optical signals input from the respective communication nodes via N optical input ports, and outputs the multiplexed signal to one optical output port. The optical wavelength-multiplexed signal is input to a 2×1 optical coupler 203.

The 2×1 optical coupler 203 wavelength-multiplexes optical signals input from two optical input ports, and connects the multiplexed signal to one optical output port. The multiplexed signal of the outputs from the (N+1)×(N+1) optical coupler 201 and the N×1 optical coupler 202 is input to an optical wavelength demultiplexer 204.

The optical wavelength demultiplexer 204 demultiplexes the wavelength in the 1.3 μm band and the wavelength in the 1.5 μm band. The optical wavelength demultiplexer 204 can adopt band-pass filters respectively transmitting the wavelengths of the 1.3 and 1.5 μm bands, and use, for example, one of an AO filter, EO filter, tunable DFB filter, Mach-Zehnder filter, Fabry-Perot filter, dielectric multi-layered film filter, and the like.

The wavelength arrangement detection system 205 detects the arrangement of wavelengths in the 1.5 μm band as that for the WDM communication system, which is input from the optical wavelength demultiplexer 204, and supplies the detection result to the WDM communication control system 208. The wavelength arrangement detection system 205 can be constituted by a wavelength variable filter, a wavelength variable filter control circuit for sweeping the wavelength by applying a control voltage to the wavelength variable filter, a photoelectric conversion element for receiving the output from the wavelength variable filter and converting it into an electrical signal, a decision circuit for outputting only components, equal to or higher than a predetermined level, of the electrical signal, and a wavelength arrangement detection circuit for detecting the wavelength arrangement of the WDM communication system on the basis of the output from the decision circuit and the control voltage to be applied to the wavelength variable filter control circuit.

The optical transmitter 206 is one for packet communications. That is, the optical transmitter 206 converts a packet signal (electrical signal; a wavelength control packet and the like) from the WDM communication control system 208 into an optical signal having a wavelength in the 1.3 μm band, and transmits the optical signal. The optical transmitter 206 is constituted by, e.g., a wavelength variable light source, a modulator, and a drive circuit. The wavelength variable light source that emits light of a wavelength in the predetermined 1.3 μm band is driven on the basis of a control signal supplied from the WDM communication control system 208 to the drive circuit, the light-emission wavelength is, e.g., intensity-modulated by a packet signal, and the modulated signal is output.

The optical receiver 207 is one for packet communications. That is, the optical receiver 207 converts a packet signal (optical signal) having a wavelength in the 1.3 μm band input from the optical wavelength demultiplexer 204 into an electrical signal, and supplies the electrical signal to the WDM communication control system 208. The optical receiver 207 is constituted by, e.g., a wavelength variable filter and a photoelectric conversion element.

The WDM communication control system 208 performs wavelength assignment of the WDM communication system by packet communications using the optical transmitter 206 and the optical receiver 207. More specifically, in packet communications, a reception request command from each communication node and wavelength control data are transmitted as a packet. Using this packet, another information may be transmitted. The control system 208 controls the wavelengths of wavelength variable optical transmitters of the respective optical nodes on the basis of information of the wavelength arrangement in the 1.5 μm band supplied from the wavelength arrangement detection system 205. Furthermore, the control system 208 performs connection control of 1×2 optical switches 111 and 112.

Each of the 1×2 optical switches 111 and 112 has one input port and two output ports, and connects an optical signal input from the optical input port to one of two optical output ports in accordance with a control signal supplied from an external circuit (in this case, the WDM communication control system 208). The 1×2 optical switches 111 and 112 are controlled by the WDM communication control system 208, and output optical signals input from the optical nodes to the (N+1)×(N+1) optical coupler 201 or the N×1 optical coupler 202.

Optical input ports 121 and 122 and optical output ports 131 and 132 are those for the optical center node, and are connected to optical nodes via optical fibers. The optical input ports 121 and 122 are connected to the 1×2 optical switches 111 and 112 via optical fibers 141 and 142. On the other hand, the optical output ports 131 and 132 are connected to the (N+1)×(N+1) optical coupler 201 via optical fibers 151 and 152.

Optical fibers 161 and 162 connect the 1×2 optical switches 111 and 112 and the (N+1)×(N+1) optical coupler 201. Optical fibers 171 and 172 connect the 1×2 optical switches 111 and 112 and the N×1 optical coupler 202.

Although the 1×2 optical switches 111 and 112, the optical input ports 121 and 122, the optical output ports 131 and 132, and the optical fibers 141, 142, 151, 152, 161, 162, and 171, and 172 are illustrated in correspondence with two communication nodes to avoid complexity of the drawing, N each components are arranged in a system having N communication nodes.

An optical fiber 181 connects the optical transmitter 207 and the (N+1)×(N+1) optical coupler 201. An optical fiber 182 connects the (N+1)×(N+1) optical coupler 201 and the 2×1 optical coupler 203. An optical fiber 183 connects the N×1 optical coupler 202 and the 2×1 optical coupler 203. An optical fiber 184 connects the 2×1 optical coupler 203 and the optical wavelength demultiplexer 204. An optical fiber 185 connects the 1.5 μm band optical output port of the optical wavelength demultiplexer 204 and the wavelength arrangement detection system 205. An optical fiber 186 connects the 1.3 μm band optical output port of the optical wavelength demultiplexer 204 and the optical receiver 206.

The operation of this embodiment will be described below. In this embodiment, the wavelength of an optical node which is being subjected to wavelength setting or has run away is prevented from causing crosstalk with other wavelengths in the WDM communication system by switching an optical path in the optical center node. Furthermore, in this embodiment, the wavelength arrangement of the WDM communication system is detected in the optical center node to switch the optical path. The optical path is switched using the 1×2 optical switches.

The optical path has the following two different connection states.

(A) State of "Optical Center Node Connection"

In this connection state, the optical signal from each optical node is transmitted to only the optical center node. Connections to all the communication nodes in the network are shielded. The detailed optical path from a communication node is as follows:

optical input port 121→optical fiber 141→1×2 optical switch 111→optical fiber 171→N×1 optical coupler 202→optical fiber 183→2×1 optical coupler 203→optical wavelength demultiplexer 204→the subsequent path is divided into two routes depending on the wavelength bands:

(a) 1.5 μm band (WDM communication system) →optical fiber 185→wavelength arrangement detection system 205→WDM communication control system 208

(b) 1.3 μm band (packet communication system) →optical fiber 186→optical receiver 206→WDM communication control system 208

In this connection state, since an optical signal of the packet communication system is also transmitted to only the optical center node, a packet transmitted from a communication node in this connection state is regenerated and relayed by the WDM communication control system of the optical center node.

(B) State of "All Optical Node Connection"

In this connection state, an optical signal from each optical node is transmitted to the optical center node and all the communication nodes. The detailed optical path from a communication node is as follows:

optical input port 121→optical fiber 141→1×2 optical switch 111→optical fiber 161→(N+1)×(N+1) optical coupler 201→the subsequent path is divided into the following routes:

(a)→optical fiber 182→2×1 optical coupler 203→the subsequent path is the same as in the optical center node connection state (b)→optical fiber 151→optical output port 131→→optical node 1

(c)→optical fiber 152→optical output port 132→→optical node 2

The optical center node normally sets the respective ports in the "all optical node connection" state while detecting the wavelength arrangement of the WDM communication system. Upon reception of a use request of the WDM communication system from a communication node (to be temporarily referred to as a communication node A hereinafter, in this embodiment) via the packet communication system, the optical center node checks the remaining wavelengths by comparing the number of wavelengths determined from the wavelength arrangement based on an electrical signal supplied from the wavelength arrangement detection system 205, and the stored number of wavelengths, so as to check whether or not the wavelength range of the WDM communication system includes a wavelength range that allows a communication. If a wavelength range that allows a communication is detected, the optical center node sets the optical input port to which the communication node A is connected in the "optical center node connection" state, so that an optical signal from the communication node A is not transmitted to nodes other than the optical center node. Thereafter, the optical center node transmits a grant for use of the WDM communication system, assignment of the wavelength, and the like to the communication node A via the optical transmitter of the packet communication system, and specifies and designates one of the remaining wavelengths. Thereafter, the optical center node continues to detect the wavelength arrangement of the WDM communication system so as to confirm whether the light-emission wavelength of the communication node A ceases to cause crosstalk with other wavelengths of the WDM communication system. The optical center node then sets the port to which the communication node A is connected in the "all optical node connection" state. The optical center node supplies a grant for start of transmission to the communication node A. Upon reception of this grant, the communication node A starts transmission via the WDM communication system.

The operation of the optical center node upon setting the wavelength of the wavelength variable optical transmitter of the communication node has been described. Next, a failure avoiding operation executed by the optical center node when the wavelength variable optical transmitter in a communication node (to be referred to as a communication node B hereinafter) runs away, and its wavelength approaches that of a neighboring channel in the WDM communication system will be explained below.

In this embodiment, since the optical center node always monitors the wavelength arrangement of the WDM communication system, it can detect that the wavelength variable optical transmitter in a certain communication node B in the network runs away, and its wavelength approaches that of a neighboring channel in the WDM communication system. When a channel, the wavelength of which is separated from that of a neighboring channel by a predetermined wavelength separation (e.g., a minimum wavelength separation that does not cause any crosstalk), is detected, the optical center node sets the input port connected to the communication node B that uses the channel in the "optical center node connection" state, so that an optical signal from the communication node B is not transmitted to all the communication nodes in the network. Thereafter, the optical center node continues to normally detect the wavelength arrangement of the WDM communication system. After the optical center node confirms that the light-emission wavelength of the communication node B is set to be separated by the predetermined wavelength separation of the WDM communication system, it sets the port connected to the communication node B in the "all optical node connection" state. Thereafter, the optical center node gives a grant for start of transmission to the communication node B. Upon reception of the grant, the communication node B restarts transmission from when it was set in the "optical center node connection" state, via the WDM communication system. With this control, crosstalk with neighboring channels can be avoided. In this case, the same control is made not only when the light-emission wavelength of a communication node runs away but also when the wavelength of a communication node deviates from the predetermined wavelength separation.

Since the optical center node always monitors the wavelength arrangement of the WDM communication system and switches the internal optical path, the wavelength of the wavelength variable optical transmitter of each communication node can be set without causing crosstalk with those of other channels. Even when wavelength variable optical transmitter runs away in a certain communication node, crosstalk with neighboring channels can be avoided.

Note that the respective functional blocks in the optical center node are connected via the optical fibers in the above arrangement, but may be directly connected without using any optical fibers. Especially, in place of the optical fibers 184, 185, 186, and the like, a Mach-Zehnder waveguide may be used to attain short, compact connections. Also, the wavelength arrangement detection system 205, the optical receiver 207, the optical transmitter 206, and the like are not limited to the above-mentioned arrangements described above, but may adopt other arrangements.

[Eleventh Embodiment]

The eleventh embodiment of the present invention will be described in detail below with reference to the accompanying drawings. In the eleventh embodiment, an optical center node of the present invention is applied to the wavelength control method suitable for high-density wavelength division multiplexing with a small wavelength separation. The arrangement of the optical center node is the same as that described in the ninth embodiment.

FIG. 18 shows the operation of the wavelength control method. FIG. 18 shows seven states of the wavelength arrangement of the WDM communication system while the abscissa plots the wavelength, and the vertical lines represent the wavelengths of the respective optical nodes. In FIG. 18, $\Delta\lambda$ is the wavelength separation to be maintained by the control between two adjacent wavelengths, and assumes a value as the sum of a given margin and the minimum wavelength separation that does not cause crosstalk between two adjacent channels in the WDM communication system. Also, $\lambda A$, $\lambda B$, $\lambda C$, and $\lambda D$ are the wavelengths of optical nodes used in an example of the operation.

This wavelength control method will be briefly described below. In this wavelength control method, wavelength assignment of the optical center node is performed not by absolute wavelengths but by relative wavelengths for controlling the wavelength separation from the light-emission wavelength of a neighboring communication node. The optical center node operates its own wavelength arrangement detection system at predetermined time intervals, and controls the wavelengths of all communication nodes which are emitting light in the wavelength band of the WDM communication system on the basis of the detection result of the wavelength arrangement detection system. This control is made via the packet communication system, so that the wavelength of the wavelength variable transmitter of each communication node which is emitting light maintains the predetermined wavelength separation $\Delta\lambda$ from a neighboring wavelength within the wavelength variable range. As a result, some groups separated by the wavelength separations $\Delta\lambda$ are formed in the wavelength arrangement, as shown in (1) of FIG. 18.

As an example, a case wherein a communication node D starts transmission via the WDM communication system ((1) to (4) of FIG. 18) and a case wherein a communication node B ends transmission via the WDM communication system ((5) to (7) of FIG. 18) will be explained below.

(A) When communication node D starts transmission via WDM communication system

Assume that a total of 11 wavelengths (five wavelengths, three wavelengths, and three wavelengths) are transmitted via the optical fibers 151 and 152, three groups are formed, and transmissions/receptions are attained using these 11 wavelengths, as shown in (1) of FIG. 18. A communication node D sends a WDM communication system use request to the optical center node via the packet communication system so as to start transmission. Upon reception of this request, the optical center node gives a grant for use of the WDM communication system to the communication node D via the packet communication system. Upon reception of the grant, the communication node D emits light at the wavelength of its own wavelength variable optical transmitter ((2) of FIG. 18). Note that the wavelength at that time is not limited to a specific position within the wavelength variable range of the wavelength variable optical transmitter, but is assumed to appear at a position near the center of the range in this case. The optical center node recognizes the new wavelength appearing in the wavelength arrangement as the wavelength λD of the communication node D. Thereafter, the optical center node shifts the wavelength λD until the wavelength separation from the neighboring wavelength λC becomes Δλ (toward the shorter wavelength side in this case; (3) of FIG. 18). After the wavelength separation Δλ is attained, the optical center node controls to maintain this interval Δλ (called a steady state; (4) of FIG. 18).

(B) When communication node B ends transmission via WDM communication system

From the state shown in (4) of FIG. 18, a communication node B ends transmission via the WDM communication system, and stops light emission of its wavelength variable optical transmitter. The optical center node detects that the wavelength separation between the wavelengths λA and λC has become larger than Δλ. The optical center node controls the wavelength separation between adjacent channels in a wavelength arrangement group to which the wavelength λB belonged to become Δλ. More specifically, the optical center node controls the wavelengths of the wavelength variable optical transmitters of communication nodes A and B, so that wavelengths λC and λD are arranged at wavelength separations Δλ with reference to the oldest light-emission wavelength (in this case, λA) of the wavelengths λA, λC, and λD that belong to this group (in this case, the center node shifts the wavelengths toward the longer wavelength side; (6) of FIG. 18). After the wavelength separation between the oldest light-emission wavelength λA and the wavelength λC, and the wavelength separation between the wavelengths λC and λD become Δλ as a result of the above-mentioned control, the optical center node controls to maintain this state (called a steady state; (7) of FIG. 18).

In the above-mentioned wavelength control method, when the wavelength variable optical transmitter of the communication node D emits light in (2) of FIG. 18, this light-emission wavelength may cause crosstalk with those of other channels in the wavelength arrangement (in this case, it causes crosstalk with the wavelength λC). In order to avoid such crosstalk, the optical center node of the present invention transmits a grant for use of the WDM communication system to the communication node, and at the same time, sets the optical input port to which the communication node is connected in an "optical center node connection" state (described in the tenth embodiment), thereby avoiding crosstalk with other channels. After the wavelength separation between adjacent channels becomes Δλ ((4) of FIG. 18), the optical center node sets the input port of the communication node D in an "all communication node connection" state (described in the tenth embodiment), thereby distributing an optical signal from the wavelength variable optical transmitter of the communication node D to all the communication nodes. Thereafter, the optical center node continues to control the wavelength arrangement to maintain the predetermined wavelength separation based on relative wavelengths using the wavelength arrangement detection system.

When the communication node B stops transmission, the wavelengths are shifted with reference to the oldest light-emission wavelength λA. However, the reference wavelength is not particularly limited. For example, the latest light-emission wavelength or a wavelength that can minimize the wavelength shift amounts may be used. In order to decrease the number of wavelength arrangement groups, the wavelength arrangement that converges to one group may be used, and the present invention is not limited to the above-mentioned example. In particular, when the wavelengths must be shifted, the output from a communication node whose wavelength is being shifted is set in the "optical center node connection" state. For this reason, a control method that determines the wavelength arrangement while predicting the earliest recovery timing to the "all communication node connection" state is preferable.

In this embodiment, high-density wavelength division multiplexing can be realized without complicating the arrangement of each communication node, and the number of channels in the WDM communication system can be increased.

[Twelfth Embodiment]

The twelfth embodiment of the present invention will be described in detail below with reference to the accompanying drawings. This embodiment relates to an optical center node having an optical path connection means different from that in the tenth embodiment.

Figure 19:
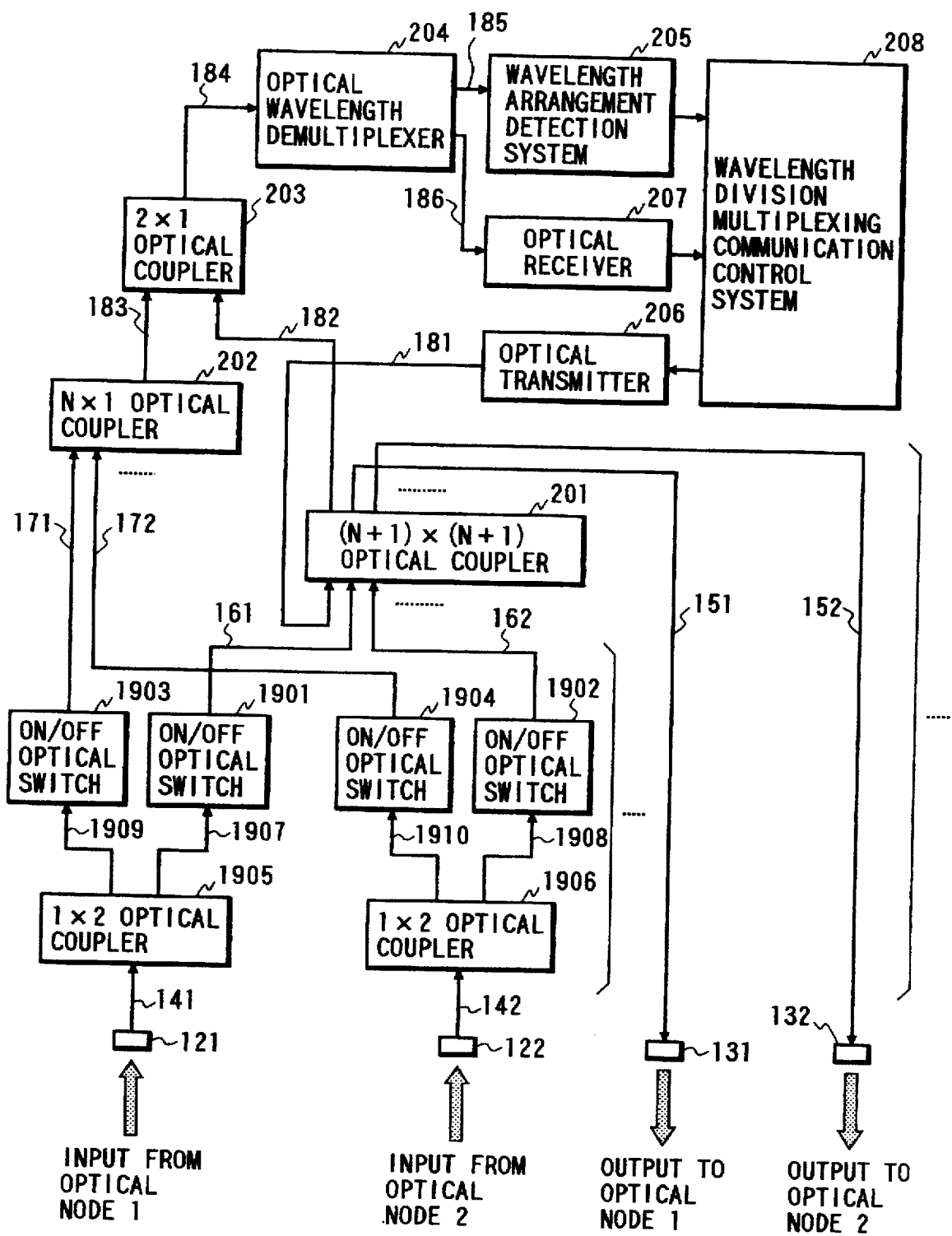
FIG. 19 is a block diagram showing an optical center node according to the twelfth embodiment of the present invention.
Figure 20:
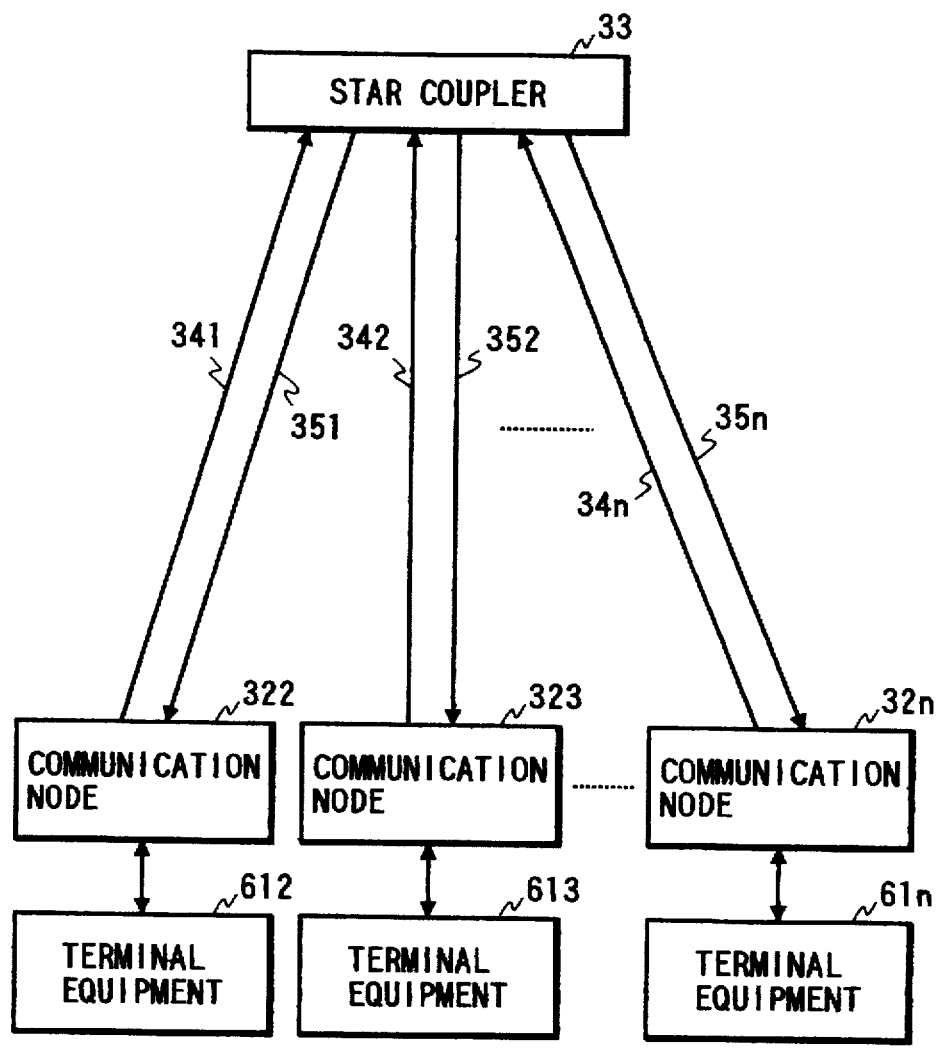
FIG. 20 is a block diagram showing the arrangement of a conventional WDM communication system.

FIG. 19 is a block diagram showing the arrangement of an optical center node according to the twelfth embodiment. In FIG. 19, the 1×2 optical switches 111 and 112 in FIG. 17 are replaced by four ON/OFF optical switches, one 1×2 optical coupler, and two optical fibers. Since the functions of other blocks are the same as those described in the tenth embodiment, a detailed description thereof will be omitted.

Each of ON/OFF optical switches 1901, 1902, 1903, and 1904 is an optical switch having one input port and one output port, and is switched in accordance with a control signal supplied from an external circuit (in this case, the WDM communication control system 208) between a state wherein it outputs an optical signal input from the optical input port to the optical output port (ON state) and a state wherein it does not output any optical signal (OFF state). The optical output ports of the ON/OFF optical switches 1901 and 1902 are connected to the (N+1)×(N+1) optical coupler 201. The optical outputs ports of the ON/OFF optical switches 1903 and 1904 are connected to the N×1 optical coupler 202. The ON/OFF optical switches 1901 and 1903 always have opposite connection states. More specifically, when the ON/OFF optical switch 1901 is in the ON state, the ON/OFF optical switch 1903 is in the OFF state. The same applies to the relationship between the states of the ON/OFF optical switches 1902 and 1904.

Each of 1×2 optical couplers 1905 and 1906 connects an optical signal input from one optical input port to two optical output ports. The 1×2 optical coupler 1905 distributes an optical signal input from the optical input port 121 to the ON/OFF optical switches 1901 and 1903. Similarly, the 1×2 optical coupler 1906 distributes an optical signal input from the optical input port 122 to the ON/OFF optical switches 1902 and 1904.

The optical path in the optical center node is switched using the ON/OFF optical switches 1901, 1902, 1903, and 1904, and the 1×2 optical couplers 1905 and 1906 as in the tenth embodiment. The optical input port 121 to which a communication node E is connected will be exemplified in detail below.

(A) "Optical Center Node Connection" State

The ON/OFF optical switch 1901 is set in the OFF state, and the ON/OFF optical switch 1903 is set in the ON state. In this state, an optical signal from the communication node E is transmitted to only the optical center node.

(B) "All Communication Node Connection" State

The ON/OFF optical switch 1901 is set in the ON state, and the ON/OFF optical switch 1903 is set in the OFF state. In this state, an optical signal from the communication node E is transmitted to all the communication node in the network.

In this manner, when the communication node E starts transmission or when the light-emission wavelength of the communication node fails, the ON/OFF optical switch 1901 is set in the ON state, and the ON/OFF optical switch 1903 is set in the OFF state to attain the "optical center node connection" state, so that the transmission wavelength of the communication node E is connected to only the optical center node. When the transmission wavelength becomes a predetermined one controlled by the WDM communication control system 208, or when the separation between the transmission wavelength and that of a neighboring node becomes a predetermined interval, the "all communication node connection" state is set, and the communication node E starts transmission of transmission information. Thereafter, the "all communication node connection" state as a normal state is maintained.

Note that the optical center node may adopt other arrangements as long as the "optical center node connection" state and "all communication node connection" state can be switched independently for each communication node.

In the descriptions of the ninth to twelfth embodiments, a WDM communication control mechanism (especially, the wavelength arrangement detection system and the WDM communication control system) is arranged in the optical center node. Alternatively, the optical center node may have input/output ports different from those for a normal communication node, and a wavelength control communication node connected to these ports may have a WDM communication control mechanism. In this case, when a certain communication node issues a transmission request, the wavelength control communication node must stop the transmission wavelength of the communication node until the light-emission wavelength of the communication node becomes a predetermined wavelength. If the first light-emission wavelength is set at the longest wavelength side, and wavelengths are arranged to be separated in turn by the predetermined wavelength separation $\Delta\lambda$ from the longest wavelength, the light-emission wavelength of the communication node that issued the transmission request can be set at the shortest wavelength side, and can be sequentially shifted to a wavelength position separated by the wavelength separation $\Delta\lambda$ from that of a neighboring node on the longer wavelength side. After the transmission wavelength is set at a predetermined wavelength, information transmission can be started. The wavelength arrangement setting means may use other methods.

The optical path of the optical center node is set in the "optical center node connection" state only when the wavelength of the wavelength variable optical transmitter is to be set or when the wavelength variable optical transmitter of a communication node runs away. Alternatively, if the optical center node regenerates and relays a packet transmitted from a communication node connected to the optical input port in the "optical center node connection" state, the "all communication node connection" state may be set during only a period from when the wavelength setting operation of the wavelength variable optical transmitter of the communication node is completed until transmission via the WDM communication system ends.

The wavelength control method described in the eleventh embodiment may use another procedure that can set a wavelength at a position separated by $\Delta\lambda$ from the neighboring wavelength upon setting the wavelength of the wavelength variable optical transmitter of a communication node.

As a star type demand assign WDM communication network as the background of the present invention, the arrangement in which the WDM communication system uses the 1.5 µm band and the packet communication system uses the 1.3 µm band is used. As long as the independence of these two communication systems can be warranted, other arrangements may be used. For example, as the packet communication system, optical fibers or electric wires for packet communications may be used.

According to the ninth to twelfth embodiments described above, since the optical center node switches its internal optical path, as described above, the wavelength of the wavelength variable optical transmitter of the WDM communication system in a communication node can be set without causing crosstalk with those of other channels.

Since the optical center node always monitors the wavelength arrangement of the WDM communication system, if the wavelength variable optical transmitter runs away in a certain communication node, the optical center node can detect this state, and can inhibit the optical signal from this communication node from being transmitted to other communication nodes.

Since the optical center node monitors and controls the wavelength arrangement of the WDM communication system, high-density wavelength division multiplexing can be realized without complicating the arrangement of each communication node, and the number of channels in the WDM communication system can be increased.

As in this embodiment, since the center node where signals from the respective communication nodes are concentrated detects the wavelength arrangement, optical path control can be attained without using another communication means.

In each of the above embodiments, in order to detect the wavelength arrangement or to receive a WDM signal, the passband wavelength of the wavelength variable filter is controlled by the control circuit, and the passband wavelength of the wavelength variable filter is recognized based on the parameter (e.g., the voltage if the passband wavelength is to be controlled by the voltage as in the above embodiment) of the control. In the present invention, appropriate control parameters may be used in correspondence with the types of wavelength variable filters (e.g., a fiber Fabry-Perot type filter used in the above embodiment, a semiconductor device, and the like), and a so-called heterodyne detecting method that recognizes the wavelength as a frequency difference from local oscillation light may be used as the wavelength detection method. When the heterodyne detecting method is used, the relationship between the wavelength of light to be detected and that of local oscillation light cannot be recognized although their difference can be recognized. As described in each of the above embodiments, when the shift direction, toward the longer or shorter wavelength side, of the transmission wavelength of a communication node is to be supplied to each communication node as wavelength control information, the arrangement using a wavelength variable filter is preferable.

The present invention is not limited to the star type network but may be applied to a bus or ring type network. In the star type network, since the time required until the wavelength control signal reaches each communication node via a star coupler becomes nearly constant if the optical path length differences between the respective communication nodes and the star coupler roughly equal each other. For this reason, wavelength control information can reach the respective communication nodes at substantially the same time.

In the present invention, one component (a wavelength control node, a communication node in a non-receiving state, or a center node) in the network system detects the wavelength arrangement, generates a signal for wavelength control on the basis of the detection result, and transmits it to the respective communication nodes. Each communication node performs wavelength control on the basis of the signal for wavelength control, thus performing communications without causing any crosstalk. Also, high-density wavelength division multiplexing can be realized. Especially, since each communication node need not independently have a wavelength selection (detection) means for detecting the wavelength arrangement and another wavelength selection (detection) means for receiving a WDM signal, the construction cost of the network can be greatly reduced.

What is claimed is:

1. A communication system comprising:

a first communication system for performing a wavelength division multiplexing communication;

a second communication system for performing a communication independently of said first communication system:

a plurality of communication nodes for performing a communication via at least said first communication system, wherein said communication nodes are adapted to terminate output of light outputted to said first communication system when the communication has been completed; and a wavelength control unit for detecting an arrangement of a plurality of wavelengths outputted from said plurality of communication nodes in said first communication system and for transmitting to said plurality of communication nodes via said second communication system, a wavelength control signal for control of intervals of the wavelengths based on the detected wavelength arrangement.

2. A system according to claim 1, wherein said wavelength control unit is a wavelength control node arranged independently of said plurality of communication nodes.

3. A system according to claim 2, wherein a plurality of wavelength control nodes equivalent to said wavelength control node are arranged.

4. A system according to claim 1, wherein the communication node, which does not receive any signal via said first communication system, of said plurality of communication nodes serves as said wavelength control unit.

5. A system according to claim 1, wherein said plurality of communication nodes are connected to a center node via said first and second communication systems, and said wavelength control unit is arranged in said center node.

6. A system according to claim 5, wherein said center node comprises selection means for selecting whether or not a signal supplied from each of said plurality of communication nodes via said first communication system is distributed to other communication nodes via said first communication system.

7. A system according to claim 1, wherein said wavelength control unit comprises a wavelength variable filter and a control circuit for controlling a passband wavelength of said wavelength variable filter.

8. A system according to claim 1, wherein each of said plurality of communication nodes comprises a wavelength variable filter, and a control circuit for controlling a passband wavelength of said wavelength variable filter.

9. A system according to claim 1, wherein said first and second communication systems are wavelength-multiplexed.

10. A system according to claim 9, wherein each of said communication nodes comprises a wavelength demultiplexer for demultiplexing signals of the wavelength-multiplexed first and second communication systems.

11. A system according to claim 1, wherein said second communication system is a communication system for performing a packet communication.

12. A system according to claim 1, wherein said plurality of communication nodes are connected to each other via distribution means for distributing a signal transmitted to said first communication system to other communication nodes.

13. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, a plurality of communication nodes for performing a communication via at least said first communication system, wherein said communication nodes are adapted to terminate output of light outputted to said first communication system for effecting communication via said first communication system when the communication has been completed, said method comprising the steps of:

detecting, using a wavelength control unit in said communication system, an arrangement of a plurality of wavelengths outputted from said communication nodes in said first communication system, and transmitting to said plurality of communication nodes via said second communication system, a wavelength control signal for control of intervals of the wavelengths based on the detected wavelength arrangement; and controlling, in each of said plurality of communication nodes, a transmission wavelength on the basis of the wavelength control signal.

14. A method according to claim 13, wherein said wavelength control unit is a wavelength control node arranged independently of said plurality of communication nodes, and said wavelength control node performs detection of the wavelength arrangement and transmission of the wavelength control signal.

15. A method according to claim 13, wherein said communication system comprises at least first and second wavelength control nodes as said wavelength control unit, said first wavelength control node performs transmission of the wavelength control signal, and said second wavelength control node performs transmission of the wavelength control signal when said first wavelength control node ceases to output the wavelength control signal.

16. A method according to claim 15, wherein said second wavelength control node monitors the wavelength control signal transmitted via said second communication system, and transmits the wavelength control signal when the wavelength control signal is not received for a predetermined period of time.

17. A method according to claim 13, wherein said communication system comprises at least first and second wavelength control nodes as said wavelength control unit, and said first and second wavelength control nodes alternately transmit the wavelength control signal.

18. A method according to claim 15, wherein said second wavelength control node monitors the wavelength control signal transmitted via said second communication system, and shortens a transmission interval of the wavelength control signal when the wavelength control signal transmitted from said first wavelength control node is not received for a predetermined period of time.

19. A method according to claim 13, wherein said communication system comprises at least first and second wavelength control nodes as said wavelength control unit, and when one of said first and second wavelength control nodes, which does not transmit the wavelength control signal, detects a control error of the wavelength arrangement in said first communication system while one of said first and second wavelength control nodes does not transmit the wavelength control signal, the wavelength control node which does not transmit the wavelength control signal transmits the wavelength control signal.

20. A method according to claim 13, wherein the communication node, which does not receive any signal via said first communication system, of said plurality of communication nodes serves as said wavelength control unit, and the communication node that serves as said wavelength control unit performs detection of the wavelength arrangement and transmission of the wavelength control signal.

21. A method according to claim 20, wherein of the communication nodes which do not receive any signal via said first communication system, the communication node in a state just before the communication node receives a signal via said first communication system or just after the communication node has finished to receive a signal via said first communication system, serves as said wavelength control unit.

22. A method according to claim 20, wherein when the communication node which does not receive any signal via said first communication system has not received the next wavelength control signal for a predetermined period of time after the communication node received one wavelength control signal, the communication node serves as said wavelength control unit, and transmits the wavelength control signal.

23. A method according to claim 20, wherein a transmission interval of the wavelength control signal to be transmitted from the communication node in a state just before the communication node receives a signal via said first communication system or just after the communication node has finished to receive a signal via said first communication system is shorter than a transmission interval of the wavelength control signal to be transmitted from the communication node in a state other than the state just after the communication node has finished to receive a signal via said first communication system and in a state wherein the communication node does not receive any signal via said first communication system.

24. A method according to claim 20, wherein the communication node that is to serve as said wavelength control unit is designated by the communication node which currently serves as said wavelength control unit.

25. A method according to claim 13, wherein said plurality of communication nodes are connected to a center node via said first and second communication systems, said wavelength control unit is arranged in said center node, and the wavelength control signal transmitted from said wavelength control unit is transferred from said center node to said plurality of communication nodes.

26. A method according to claim 25, wherein said center node does not distribute a signal transmitted from each of said plurality of communication nodes via said first communication system to other communication nodes until a wavelength of the signal becomes a predetermined wavelength.

27. A method according to claim 13, wherein the wavelength control signal includes wavelength control information for all channels used in said first communication system.

28. A method according to claim 27, wherein the wavelength control signal includes, as information for controlling the wavelength of each channel, information for "maintaining", "shifting to a longer wavelength side", and "shifting to a shorter wavelength side" the wavelength of each channel.

29. A method according to claim 27, wherein the wavelength control signal includes information indicating a channel which is not used in said first communication system.

30. A method according to claim 29, wherein each of said communication nodes determines a channel to be used on the basis of the information which indicates the channel that is not used, and which is included in the wavelength control signal.

31. A method according to claim 13, wherein each of said plurality of communication nodes is assigned a channel to be used in said first communication system by demand assign control using said second communication system.

32. A method according to claim 13, wherein the wavelength control signal includes information for controlling wavelengths of channels used in said first communication system so that the wavelengths are arranged at a predetermined wavelength separation.

33. A communication system comprising:

a first communication system for performing a wavelength division multiplexing communication;

a second communication system for performing a communication independently of said first communication system;

a plurality of communication nodes for performing a communication via at least said first communication system; and a wavelength control unit for detecting a wavelength arrangement in said first communication system and for transmitting to said plurality of communication nodes via said second communication system, a wavelength control signal based on the detected wavelength arrangement, wherein each of said plurality of communication nodes has the function of said wavelength control unit, and a communication node having a state that no signal via said first communication system is being received among said plurality of communication nodes serves as said wavelength control unit.

34. A communication system comprising:

a first communication system for performing a wavelength division multiplexing communication;

a second communication system for performing a communication independently of said first communication system;

a plurality of communication nodes for performing a communication via at least first communication system; and a wavelength control unit for detecting a wavelength arrangement in said first communication system and for transmitting to said plurality of communication nodes via said second communication system, a wavelength control signal based on the detected wavelength arrangement, wherein said wavelength control signal includes wavelength information of plural channels used in said first communication system.

35. A communication system comprising:

a first communication system for performing a wavelength division multiplexing communication;

a second communication system for performing a communication independently of said first communication system:
  a plurality of communication nodes for performing a communication via at least said first communication system; and
  a wavelength control unit for detecting a wavelength arrangement in said first communication system, and transmitting a wavelength control signal based on the detected wavelength arrangement to said plurality of communication nodes via said second communication system,
  wherein said plurality of communication nodes are connected to a center node via said first and second communication systems, and said wavelength control unit is arranged in said center node, and
  wherein said center node comprises selection means for selecting whether or not a signal supplied from each of said plurality of communication nodes via said first communication system is distributed to other communication nodes via said first communication system.

36. A communication system comprising:
a first communication system for performing a wavelength division multiplexing communication;
a second communication system for performing a communication independently of said first communication system:
  a plurality of communication nodes for performing a communication via at least said first communication system; and
  a wavelength control unit for detecting a wavelength arrangement in said first communication system, and transmitting a wavelength control signal based on the detected wavelength arrangement to said plurality of communication nodes via said second communication system,
  wherein each of said plurality of communication nodes comprises a wavelength variable filter, and a control circuit for controlling a passband wavelength of said wavelength variable filter.

37. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:
  detecting, using a wavelength control unit in said communication system, a wavelength arrangement in said first communication system, and transmitting a wavelength control signal based on the detected wavelength arrangement to said plurality of communication nodes via said second communication system; and
  controlling, in each of said plurality of communication nodes, a transmission wavelength on the basis of the wavelength control signal,
  wherein said communication system comprises at least first and second wavelength control nodes as said wavelength control unit, said first wavelength control node performs transmission of the wavelength control signal, and said second wavelength control node performs transmission of the wavelength control signal when said first wavelength control node ceases to output the wavelength control signal.

38. A method according to claim 37, wherein said second wavelength control node monitors the wavelength control signal transmitted via said second communication system, and transmits the wavelength control signal when the wavelength control signal is not received for a predetermined period of time.

39. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:
  detecting, using a wavelength control unit in said communication system, a wavelength arrangement in said first communication system, and transmitting a wavelength control signal based on the detected wavelength arrangement to said plurality of communication nodes via said second communication system; and
  controlling, in each of said plurality of communication nodes, a transmission wavelength on the basis of the wavelength control signal,
  wherein said communication system comprises at least first and second wavelength control nodes as said wavelength control unit, and said first and second wavelength control nodes alternately transmit the wavelength control signal.

40. A method according to claim 37, wherein said second wavelength control node monitors the wavelength control signal transmitted via said second communication system, and shortens a transmission interval of the wavelength control signal when the wavelength control signal transmitted from said first wavelength control node is not received for a predetermined period of time.

41. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:
  detecting, using a wavelength control unit in said communication system, a wavelength arrangement in said first communication system, and transmitting a wavelength control signal based on the detected wavelength arrangement to said plurality of communication nodes via said second communication system; and
  controlling, in each of said plurality of communication nodes, a transmission wavelength on the basis of the wavelength control signal,
  wherein said communication system comprises at least first and second wavelength control nodes as said wavelength control unit, and when one of said first and second wavelength control nodes, which does not transmit the wavelength control signal, detects a control error of the wavelength arrangement in said first communication system while one of said first and second wavelength control nodes does not transmit the wavelength control signal, the wavelength control node which does not transmit the wavelength control signal transmits the wavelength control signal.

42. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein the communication node, which does not receive any signal via said first communication system, of said plurality of communication nodes serves as said wavelength control unit, and the communication node that serves as said wavelength control unit performs detection of the wavelength arrangement and transmission of the wavelength control signal, and wherein of the communication nodes which do not receive any signal via said first communication system, the communication node in a state just before the communication node receives a signal via said first communication system or just after the communication node has finished to receive a signal via said first communication system, serves as said wavelength control unit.

43. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein of the communication nodes which do not receive any signal via said first communication system, the communication node in a state just before the communication node receives a signal via said first communication system or just after the communication node has finished to receive a signal via said first communication system, serves as said wavelength control unit, and wherein when the communication node which does not receive any signal via said first communication system has not received the next wavelength control signal for a predetermined period of time after the communication node received one wavelength control signal, the communication node serves as said wavelength control unit, and transmits the wavelength control signal.

44. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein the communication node, which does not receive any signal via said first communication system, of said plurality of communication nodes serves as said wavelength control unit, and the communication node that serves as said wavelength control unit performs detection of the wavelength arrangement and transmission of the wavelength control signal, and wherein a transmission interval of the wavelength control signal to be transmitted from the communication node in a state just before the communication node receives a signal via said first communication system or just after the communication node has finished to receive a signal via said first communication system is shorter than a transmission interval of the wavelength control signal to be transmitted from the communication node in a state other than the state just after the communication node has finished to receive a signal via said first communication system and in a state wherein the communication node does not receive any signal via said first communication system.

45. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein the communication node, which does not receive any signal via said first communication system, of said plurality of communication nodes serves as said wavelength control unit, and the communication node that serves as said wavelength control unit performs detection of the wavelength arrangement and transmission of the wavelength control signal, and wherein the communication node that is to serve as said wavelength control unit is designated by the communication node which currently serves as said wavelength control unit.

46. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein said plurality of communication nodes are connected to a center node via said first and second communication systems, said wavelength control unit is arranged in said center node, and the wavelength control signal transmitted from said wavelength control unit is transferred from said center node to said plurality of communication nodes, and wherein said center node does not distribute a signal transmitted from each of said plurality of communication nodes via said first communication system to other communication nodes until a wavelength of the signal becomes a predetermined wavelength.

47. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein the wavelength control signal includes wavelength control information for all channels used in said first communication system, and wherein the wavelength control signal includes, as information for controlling the wavelength of each channel, information for "maintaining", "shifting to a longer wavelength side", and "shifting to a shorter wavelength side" the wavelength of each channel.

48. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein the wavelength control signal includes wavelength control information for all channels used in said first communication system, and wherein the wavelength control signal includes information indicating a channel which is not used in said first communication system.

49. A method according to claim 48, wherein each of said communication nodes determines a channel to be used on the basis of the information which indicates the channel that is not used, and which is included in the wavelength control signal.

50. A wavelength control method for controlling a wavelength of light to be output from each of a plurality of communication nodes to a first communication system in a communication system which comprises a first communication system for performing a wavelength division multiplexing communication, a second communication system for performing a communication independently of said first communication system, and a plurality of communication nodes for performing a communication via at least said first communication system, comprising the steps of:

detecting, using a wavelength control unit in said communication system, a wavelength arrangement in said first communication system, and transmitting a wavelength control signal based on the detected wavelength arrangement to said plurality of communication nodes via said second communication system; and controlling, in each of said plurality of communication nodes, a transmission wavelength on the basis of the wavelength control signal, wherein each of said plurality of communication nodes is assigned a channel to be used in said first communication system by demand assign control using said second communication system.

51. A communication system comprising:

a first communication system for performing a wavelength division multiplexing communication;

a second communication system for performing a communication independently of said first communication system:

a plurality of communication nodes for performing a communication via at least said first communication system; and a wavelength control unit for detecting a wavelength arrangement in said first communication system, and transmitting a wavelength control signal based on the detected wavelength arrangement to said plurality of communication nodes via said second communication system, wherein said first and second communication systems are wavelength-multiplexed, and
wherein each of said communication nodes comprises a wavelength demultiplexer for demultiplexing signals of the wavelength-multiplexed first and second communication systems.

* * * * *